United States Patent [19]
Gates et al.

[11] Patent Number: 6,070,200
[45] Date of Patent: May 30, 2000

[54] HOST ADAPTER HAVING PAGED DATA BUFFERS FOR CONTINUOUSLY TRANSFERRING DATA BETWEEN A SYSTEM BUS AND A PERIPHERAL BUS

[75] Inventors: Stillman F. Gates, Los Gatos; Salil Suri, Fremont, both of Calif.

[73] Assignee: Adaptec, Inc., Milpitas, Calif.

[21] Appl. No.: 09/089,311

[22] Filed: Jun. 2, 1998

[51] Int. Cl.[7] .................................................... G06F 13/00
[52] U.S. Cl. .................................. 710/20; 710/4; 710/20; 710/21; 710/52; 395/275
[58] Field of Search .............................. 710/1, 4, 20, 21, 710/52, 62, 126, 129; 711/110, 171; 395/250, 275

[56] References Cited

U.S. PATENT DOCUMENTS

| | | | |
|---|---|---|---|
| 4,905,184 | 2/1990 | Giridhar et al. | 364/900 |
| 5,396,597 | 3/1995 | Bodin et al. | 395/275 |
| 5,657,273 | 8/1997 | Ayukawa et al. | 365/189.01 |
| 5,659,690 | 8/1997 | Stuber et al. | 710/129 |
| 5,732,223 | 3/1998 | Moore et al. | 395/250 |
| 5,867,672 | 2/1999 | Wang et al. | 710/127 |
| 5,881,281 | 3/1999 | Gates et al. | 713/1 |

*Primary Examiner*—Thomas C. Lee
*Assistant Examiner*—Chun Cao
*Attorney, Agent, or Firm*—Skjerven, Morrill, MacPherson, Franklin & Friel LLP

[57] ABSTRACT

A host adapter has receive and transmit data paths, each of which includes a buffer (formed of storage elements) for temporarily holding the data being transferred by the host adapter. The host adapter uses each of the two buffers for storing only the data being transferred in the respective direction, each independent of the other, for full-duplex data transfer therethrough. To permit parallel flow-through operation, each of the two buffers is organized into a number of fixed-sized pages that are accessible via the peripheral bus only one page at a time. To maximize bandwidth and minimize latency, during operation in any given direction of data transfer (e.g. from the computer bus to the peripheral bus or vice versa) the host adapter uses at least two pages in a data path simultaneously: one for receipt and another for transmission. Specifically, each data path uses one page to hold data that is currently being received, while using another page containing data that was previously received for simultaneous transmission from the host adapter. Each of the data paths transfers data in a continuous manner irrespective of the context (e.g. peripheral device address, or system memory address or a sequence identifier of a Fibre Channel frame) of the data. Specifically, each data path uses one page to hold data that is currently being received from one context, while using another page containing data of another context that was previously received for simultaneous transmission from the host adapter.

17 Claims, 9 Drawing Sheets

HOST ADAPTER HAVING PAGED DATA BUFFERS FOR CONTINUOUSLY TRANSFERRING DATA BETWEEN A SYSTEM BUS AND A PERIPHERAL BUS

CROSS-REFERENCE TO RELATED APPLICATIONS

This application is related to and incorporates by reference herein in their entirety, the following copending, concurrently filed, commonly owned U.S. Patent Applications:

(1) Ser. No. 09/089,030 (Pending) entitled "A Host Adapter Having A Snapshot Mechanism," by Salil Suri Taikhim Henry Tan;

(2) Ser. No. 09/089,044 (Pending), entitled "Multiple Access Memory Architecture" by Stillman Gates and Uday N. Devanagundy;

(3) Ser. No. 09/089,057 (Pending), entitled "Decoupled Serial Memory Access with Passkey Protected Memory Areas" by Uday N. Devanagundy et al;

(4) Ser. No. 09/088,812 (Pending), entitled "Source-Destination Re-Timed Cooperative Communication Bus" by Stillman Gates.

CROSS-REFERENCE TO THE ATTACHED APPENDICES

Appendices A–F, which are part of the present disclosure, are included in a microfiche appendix consisting of 19 sheets of microfiche having a total of 1036 frames, and the microfiche appendix is incorporated herein by reference in its entirety. Microfiche Appendices A–C are listings of computer programs and related data including source code in the language VERILOG for implementing a "receive payload buffer and manager" for use with one embodiment of this invention as described more completely below. Microfiche Appendices D–F are a listing of documentation for the computer programs of Microfiche Appendices A–C. Appendix G is a paper appendix consisting of pages 10 attached hereto, and is a listing of computer progams of the type described above in reference to Appendices A–C.

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The present invention is related generally to a host adapter for transferring information between a first bus inside a personal computer (also called "computer bus") and a second bus to which one or more peripheral devices (such as disk drives) are connected (also called "peripheral bus"), and in particular to a circuit that transfers to the computer bus data that was previously received from the peripheral bus and vice versa.

2. Description of the Related Art

A personal computer 90 (FIG. 1A) includes a plug-in board 10 that is coupled to two buses namely (1) a computer bus (such as the ISA/EISA bus well known in the art) 20 on a mother board 60 and (2) a peripheral bus (e.g. SCSI bus also well known in the art) 40. Peripheral bus 40 is, in turn, connected to one or more peripheral devices, e.g. devices 31 and 32. Similarly, computer bus 20 is coupled to one or more devices on board 60, such as system memory 64, and to a local bus 65 that in turn is coupled to a host processor 61 (e.g. the microprocessor PENTIUM available from Intel Corporation, Santa Clara, Calif.). Local bus 65 is also coupled to a read only memory (also called "processor ROM") 62 that holds software, e.g. Basic Input-Output System (BIOS) instructions to be executed by processor 61 on power up. Moreover, plug-in board 10 also includes a read only memory 11 that is programmed with instructions to be executed by host adapter 12 on power up. Instead of being mounted on a separate board 10, host adapter 12 and read only memory 11 can be mounted directly on a mother board 70 (FIG. 1B).

Peripheral bus 40 may conform to the specification of the Small Computer System Interface (SCSI) standard available from the American National Standards Institute (ANSI x3.131-1986) of 1430 Broadway, New York, N.Y. 10018. The just-described SCSI standard specification is incorporated by reference herein in its entirety. Additional descriptions related to the SCSI bus may be found in, for example, U.S. Pat. Nos. 4,864,291 and 4,905,184 that are both incorporated by reference herein in their entirety.

Computer bus 20 may conform to any of the computer bus standards, such as the Industry Standard Architecture (ISA), Extended ISA (EISA), or Peripheral Component Interconnect (PCI). The PCI specification is available from PCI Special Interest Group (SIG), M/S HF3-15A, 5200 NE Elam Young Parkway, Hillsborough, Oreg. 97124-6497, phone number 503/696-2000, and is incorporated by reference herein in its entirety. Additional descriptions related to the PCI bus can be found in the book "PCI System Architecture", Second Edition, by Tom Shanley and Don Anderson, MindShare Press, Richardson, Tex., 1994 also incorporated by reference herein in its entirety.

Computer bus 20 is typically faster than peripheral bus 40, and therefore a conventional host adapter 12 (as described in, for example, U.S. Pat. No. 5,659,690 by Stuber et al that is incorporated by reference herein in its entirety) has a FIFO buffer to collect data from peripheral bus 40, and transfer the collected data in a burst mode over computer bus 20. Host adapter 12 can transfer the data from a peripheral device 31 directly to system memory 64, without intervention of host processor 61, in a mechanism known as "Direct Memory Access" (DMA), as described by Stuber et al at column 90, line 38 et seq.

The data transfer described above can be initiated by transferring to host adapter 12 a command in the form of a "Sequencer Control Block" (SCB) that contains information needed by host adapter 12 to perform the data transfer, as described by Stuber et al. at column 17, line 66 et. seq. Moreover, host adapter 12 can transfer the data to/from system memory 64 via a scatter/gather mechanism that stores the data in a number of portions in system memory 64. The SCB includes "a pointer to a scatter/gather data transfer pointer list, [and] a count of the number of elements in the scatter/gather list" (column 18, lines 3–5) that together indicate the portions of system memory 64 (FIG. 1A) to or from which the data is to be transferred.

Host adapter 12 typically has more than one SCSI command pending in a queue of SCBs as described by Stuber et al. at column 20, line 1 et seq. In one example, SCBs for each of two peripheral devices 31 and 32 are queued, and when a first peripheral device 31 disconnects from host adapter 12 (e.g. while the drive mechanics are repositioned) host adapter 12 communicates with a second peripheral device 32 to execute an SCSI command indicated by the another SCB.

The ability of host adapter 12 to switch back and forth between SCBs, is referred to as "context switching" (Stuber et al., column 20, line 9). During a context switch (e.g. when a data transfer is suspended or is completed), a new data transfer is not started until the above-described FIFO buffer in host adapter 12 (that was used to collect data from peripheral bus 40) is emptied. Depending on the size of the FIFO buffer, peripheral bus 40 may remain idle for a significant duration, e.g. several microseconds.

SUMMARY OF THE INVENTION

A host adapter in accordance with the invention includes a first circuit (hereinafter "receive data path") that receives data from a peripheral bus (that is coupled to a peripheral device) and transfers the received data to a computer bus (that is located inside a personal computer). The host adapter also includes a second circuit (hereinafter "send data path") that transfers data in the opposite direction, specifically from the computer bus to the peripheral bus. The rate of receipt of data by the host adapter from the peripheral bus is smaller than the rate of transfer of data from the host adapter to the computer bus. Therefore, each of the receive data path and the transmit data path includes a buffer (formed of storage elements) for temporarily holding the data being transferred. The host adapter uses each of the two buffers for storing only the data being transferred in the respective direction, each independent of the other, for full-duplex data transfer therethrough.

In one embodiment, each of the two data paths simultaneously receives and transmits data from/to each of peripheral bus and computer bus. For example, the receive data path transmits data on the computer bus while simultaneously receiving data from the peripheral bus. Similarly, the send data path transmits data on the peripheral bus while simultaneously receiving data from the computer bus. To permit parallel flow-through operation, each of the two buffers is organized into a number of fixed-sized pages that are accessible via the peripheral bus only one page at a time. To maximize bandwidth and minimize latency, during operation in any given direction of data transfer (e.g. from the computer bus to the peripheral bus or vice versa) the host adapter uses at least two pages in a data path simultaneously: one for receipt and another for transmission. Specifically, each data path uses one page to hold data that is currently being received, while using another page containing data that was previously received for simultaneous transmission from the host adapter.

In another embodiment, each of the data paths transfers data in a continuous manner irrespective of the context (e.g. peripheral device address, or system memory address or a sequence identifier of a Fibre Channel frame) of the data. Specifically, each data path uses one page to hold data that is currently being received from one context, while using another page containing data of another context that was previously received for simultaneous transmission from the host adapter. Therefore, neither of the data paths waits for previously-received data of one context to be completely emptied prior to receipt of additional data of a different context as required by a prior art host adapter. Therefore, a host adapter as described herein uses fixed-size pages to eliminate the prior art delay associated with such waiting, and maintains a steady stream of data flowing on each of the peripheral bus and the computer bus for as long as possible.

The host adapter receives data from and transmits data to the peripheral bus in a number of messages (such as "frames"), each message having a header and a block of data (e.g. "payload"). The host adapter temporarily stores, if necessary, the payload of a message passing therethrough, in one or more pages of the type described above. Each page holds the data of at most one payload, even if a page has storage elements that are available to hold data from one or more additional payloads. If a page has fewer storage elements than the number required to hold the data from a single payload, then multiple pages are used to hold the data. Therefore, the total number T of pages in a buffer is always greater than (e.g. at least twice) the number of pages required to hold the maximum-sized payload. The multiple pages used to hold data from the same context represent variable-sized segments (as viewed from the computer bus). Specifically, each segment contains one or more pages that are used to hold the data of a single payload, or data of multiple payloads that all belong to the same context. The size of a segment can change, depending on the context, between a predetermined (non-zero) minimum and a predetermined maximum. Grouping of multiple pages into a segment as described herein allows data from the same context, although spread over multiple pages, to be transferred continuously (i.e. received or transmitted) over the computer bus.

In one embodiment of the host adapter, each data path includes two or more circuits that operate simultaneously, thereby to provide pipelined processing. Specifically, each data path includes a control circuit for processing the header, and a storage circuit for storing and forwarding the payload. For example, the receive data path includes a first control circuit (hereinafter "receive frame control," abbreviated as "RFC") that analyzes the header of each message received from the peripheral bus, and generates one or more control signals for controlling operations of a first storage circuit (hereinafter "receive payload buffer and manager," abbreviated as "RPB"). Similarly, the send data path includes a second storage circuit (hereinafter "send payload buffer and manager," abbreviated as "SPB") that receives data from the computer bus, and when enough data has been received to form a payload of a predetermined size, a second control circuit (hereinafter "send frame control," abbreviated as "SFC") prepares the header of a message containing the payload to be transmitted on the peripheral bus. Two or more circuits that operate simultaneously in a pipelined manner as described herein speed up the processing of messages in a manner not possible when using a single circuit For example, the receive frame control compares all the fields in a header of a message with expected values, and in case of a match indicates that the payload belongs to the same context as the payload of a previous message while the receive payload buffer and manager is receiving the payload. The receive frame control may complete processing a header even before completion of receipt of the payload, so that the payload can be processed as soon as completely received. Moreover, if the receive frame control finds an error in the header, the error is flagged even prior to receipt of a checksum that is normally received at the end of a payload (for example in the Fibre Channel protocol).

The receive payload buffer and manager stores and forwards the data from one or more payloads to the computer bus in response to the control signals from the receive frame control. One of the above-described buffers (hereinafter "receive payload memory") that is organized into pages (and the pages grouped into segments) is included in the receive payload buffer and manager. Specifically, the receive payload memory contains a predetermined number (e.g. 9) of the above-described pages, for temporarily holding data from the peripheral bus prior to transmission on the computer bus. The receive payload buffer and manager transfers to the computer bus, from a segment (containing one or more pages) in the receive payload memory, data (also called "previously-received" data) that was previously received in one or more messages from the peripheral bus, while additional data from another message is being simultaneously received from the peripheral bus in another page of the receive payload memory. Therefore, the receive data path transfers data to the computer bus in a continuous manner, even if various parts of the data being transferred are received in multiple payloads. Moreover, the data being currently received by the receive payload buffer and manager can be of a context different from the context of data that was previously received. Also, irrespective of the context, the receive payload buffer and manager transfers currently-received data in tandem with the previously-received data (i.e. the currently-received data follows the previously-received data in a continuous manner, without any break), if receipt of a payload containing the currently-received data is completed prior to completion of transmission of the previously-received data. Such in-tandem transmission of data from multiple contexts assists in maintenance of a stream of data flowing from the host adapter to the computer bus for as long as possible.

The send payload buffer and manager also stores and forwards data from the computer bus, after sufficient amount of data for a single page has been received. So, another of the above-described buffers hereinafter "send payload memory") that is organized into pages is included in the send payload buffer and manager. Specifically, the send payload memory contains a predetermined number (e.g. 2) of the above-described pages, for temporarily holding the data prior to transmission on the peripheral bus. The send frame control transfers to the peripheral bus, from a page in the send payload memory, data (also called "previously-received" data) that was previously received from the computer bus, while additional data is being simultaneously received from the computer bus in another page of the send payload memory. Therefore, the send data path receives data from the computer bus in a continuous manner, even if various parts of the data being received are from different contexts. Specifically, the data being currently received by the send payload buffer and manager can be of a context different from the context of data that was previously received. Therefore, irrespective of the context, the send payload buffer and manager receives data (also called "currently-received" data) in tandem with the previously-received data, when a page is available to hold the currently-received data. Such in-tandem receipt of data of multiple contexts assists in maintenance of a stream of data flowing from the computer bus to the host adapter for as long as possible.

In one embodiment, the two data paths use a first group of P pages (e.g. one or more pages) to hold data to be transferred in (or previously received from) a first message, while simultaneously storing additional data to be transferred in a (or currently received from) a second message in a second group of P pages. In this embodiment, the total number of pages in each payload memory is at least $T=2P+1$. As the receive payload memory can temporarily store at least two payloads, the receive payload buffer and manager enables the receipt of two messages at power -up or reset, e.g. one from each of two different peripheral devices (or from the same peripheral device) that are coupled to the peripheral bus. The one or more additional pages (i.e. the one or more pages in excess of the 2P pages of the two groups) are used to receive a portion of a payload from a third message, even before all P pages used to hold the payload of the first message become available. The receipt of data from a third message even before completely transmitting data from a first message (and the temporary storage of data from a second message) assists in maintaining a stream of data flowing from the peripheral bus into the host adapter for as long as possible. As the receive data path handles context switches without requiring flushing (as required in the prior art), in one example each of the three messages are of three different contexts.

In one implementation, the peripheral bus conforms to the Fibre Channel specification, wherein the payload has one of the following sizes: 128 bytes, 256 bytes, 512 bytes, 1024 bytes, and 2048 bytes (payload size of 2112 bytes is not supported in this implementation). Therefore, each payload memory that is to be coupled to a Fibre Channel bus has, at a minimum, storage elements that are greater in number than 2048 (assuming each storage element holds 1 byte). Specifically, in one example, the storage elements are grouped into a number of pages, each page having 512 storage elements, and the total number of pages is at least eight (wherein four pages are used to hold the 2048 bytes from the largest payload). In the just-described example, the total number of pages in each payload memory is 2P+1 pages (i.e. 2*4+1=9 pages). The receive payload buffer and manager enables receipt of payload from the third message when P−1 pages (i.e. 3 pages) of the first group (that were used to hold the first message's payload) are freed up.

In one embodiment, the receive frame control has a first data bus (hereinafter "write data bus") and a first control bus (hereinafter "write control bus") that are both coupled to the receive payload buffer and manager. The receive frame control also has a number of first lines (hereinafter "message input bus") coupled to the peripheral bus for receipt of the messages. The receive frame control provides on the write data bus the data retrieved from a message received on the message input bus, and simultaneously drives a first write control signal (hereinafter "write enable" signal) active (e.g. high) on the write control bus. In response to the active write enable signal, the receive payload buffer and manager begins to latch data from the write data bus once every clock cycle. The receive frame control also indicates the end of data to be stored by the receive payload buffer and manager, e.g. by driving the write enable signal inactive(e.g. low), thereby to keep the receive payload buffer and manager from latching further data.

In one implementation, the receive payload memory includes, associated with each page, a number of storage elements (also called "status storage elements") that are used to hold the status of the data contained in the associated page. For example, the receive payload buffer and manager stores an active signal in a first storage element (hereinafter "end-of-payload" flag) when the write enable signal is deactivated. When a message's payload is smaller than a page, the end-of-payload flag associated with the page is set, thereby to indicate that the page contains all of the payload. If the size of a message's payload is larger than the size of a page (e.g., if a total of four pages are required to hold a payload), the receive payload buffer and manager stores an inactive signal in the end-of-payload flag in the preceeding pages (e.g. in first three pages), and stores an active signal in the end-of-payload flag only in the last page (e.g. fourth page) because the write enable signal is deactivated only during storage into the last page. Therefore, the active signal in the last page indicates that the the data in all the preceding pages is of the same context as the current page, and that no more data is available beyond the current page (e.g. that the payload is being held in the four pages). Moreover, when the receive payload buffer and manager begins to store a payload into a next page that is adjacent to the current page, and both pages contain data from the same context, the receive payload buffer and manager clears the end-of-payload flag in the current page. Therefore, the inactive signal in the current page indicates that more data is available in the next page(e.g. that data from the same context is being held in four pages). The receive payload buffer and manager uses the end-of-payload flag when passing signals from the receive payload memory to a second data bus (hereinafter "read data bus") for transmission to the computer bus. Specifically, the receive payload buffer and manager uses the end-of-payload flag to continue to increment the address of a read pointer (used for data transmission to the read data bus) between multiple pages that hold data from the same context, e.g. from pointing to a storage element at the end of a current page to a storage element at the beginning of the next page, while maintaining continuity in the transfer of data to the read data bus during movement of the read pointer between pages.

In the above-described embodiment, the receive frame control drives a second write control signal (hereinafter "context switch" signal) active on the write control bus if the context of the next message is different from the context of the previous message. In response to the active context switch signal, the receive payload buffer and manager stores the active signal in a second status storage element (hereinafter "end-of-context" flag), and stores an inactive signal in the end-of-payload flag. Therefore, in the above-described example, if each message is smaller than a page, and four messages have been received from the same peripheral device, and the next message is from a different peripheral device, then the end-of-context flag is set for the fourth page, and all four pages have the end-of-payload flag clear. Thereafter, the receive payload buffer and manager uses the end-of-context flag at the time of updating the read pointer to drive a read control signal (hereinafter "context done" signal) active to indicate that the signals on the read data bus contain the last data of a context. The context done signal allows multiple pages of data from different contexts to be transmitted in a continuous manner, because a bus interface module (hereinafter "host interface module") that receives the signals from the read data bus and passes the signals to the computer bus causes another module (hereinafter "sequencer module") to automatically change the destination address in response to the active context done signal.

The host interface module has a number of second lines (hereinafter "data output bus") that are coupled to the computer bus, and also has a second control bus (hereinafter "read control bus"), and a second data bus (hereinafter "read data bus") that are both coupled to the receive payload buffer and manager. In response to an active signal on the read control bus, the host interface module transfers data from the read data bus to the computer bus. In this embodiment, the host interface module includes a number of storage elements that are used to maintain, for as long as possible, a flow of data on the computer bus. Specifically, the host interface module uses a first group of storage elements that hold a current address and a current count for transferring data from the read data bus to the system memory while decrementing the current count. When the current count reaches zero, or in response to the above-described read control signal, the host interface module switches to using a second group of storage elements that hold the next address and the next count. While the host interface module is using the second group of storage elements the sequencer module writes a new address and count into the first group of storage elements for use in future. Therefore, the host interface module keeps on transferring data to the computer bus in a continuous manner, while alternating between use of the first group of storage elements and the second group of storage elements, until all available data has been transferred (as indicated by a control signal on the read control bus).

DETAILED DESCRIPTION

Figures 1A, 1B:
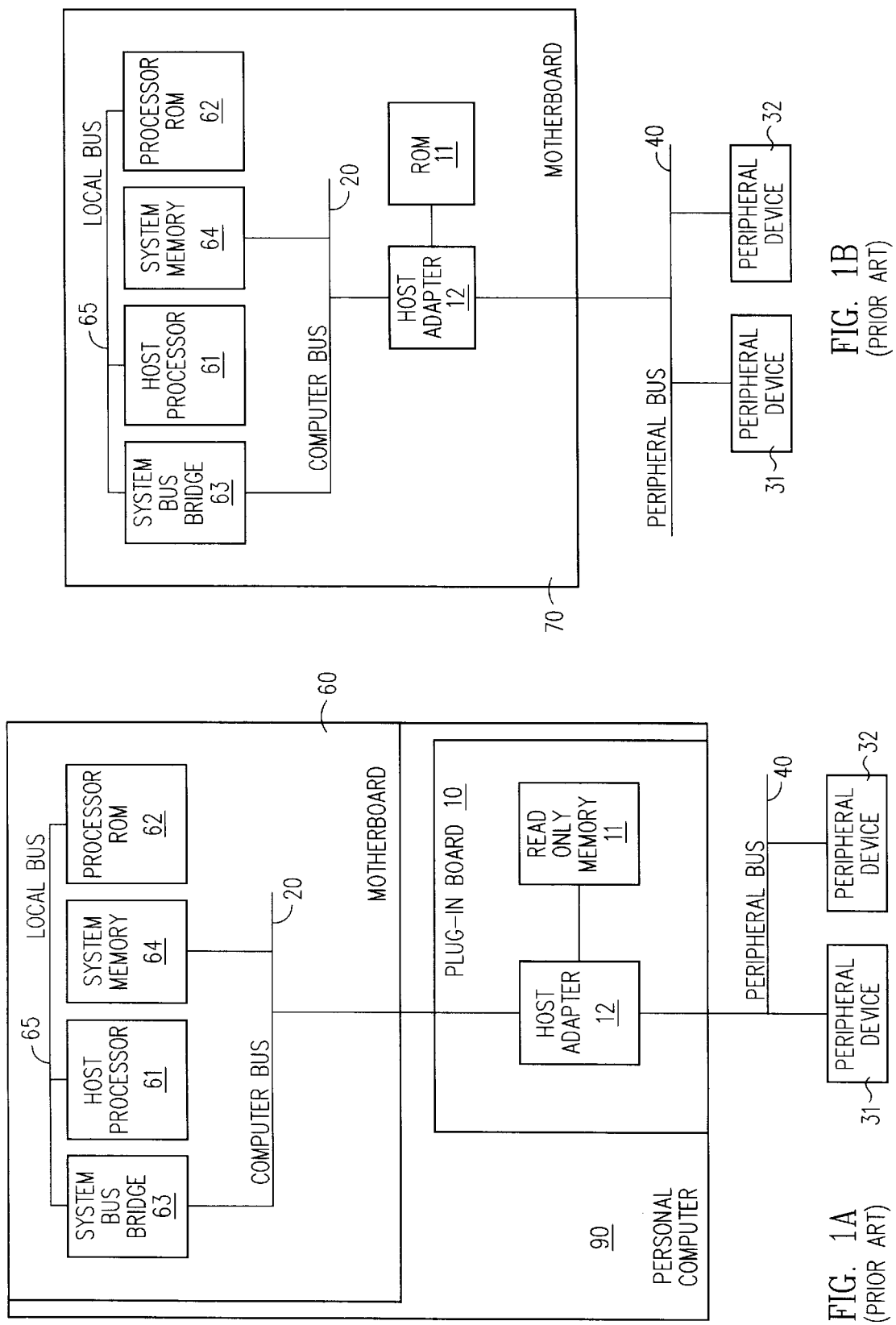
FIGS. 1A and 1B illustrate two variants of a prior art personal computer having a host adapter for transferring data between a peripheral bus external to the personal computer, and a computer bus located inside the personal computer and coupled to various components contained therein (such as a processor, and a system memory).

In one embodiment of the invention, a host adapter 112 (FIG. 2A) transfers data between a peripheral bus 140 to which are coupled a number of peripheral devices (e.g. devices 131 and 132) and a computer bus 120 (such as the PCI bus described above) to which is coupled a system memory 164 of a personal computer. Specifically, host adapter 112 receives data from and transmits data to peripheral bus 140 in a number of messages (such as "frames" of the Fibre Channel protocol), each message having a header (e.g. 24 byte field) and a block of data (also called "payload"). Peripheral bus 140 can be a bus in conformance with the Fibre Channel protocol as described by the X3T11 standards of committee of ANSI, see the documentation available from the Internet at http://www.fcloop.org/technology/faqs/fc_fa_4.htm, and http://www.1.cern.ch/HSI/fcs/spec/overview.htm. As Fibre Channel protocol is a point to point protocol, in one embodiment host adapter 112 communicates with a peripheral device 131 via bus 140 using the SCSI protocol.

Host adapter 112 of this embodiment receives and transmits data in parallel form, i.e. has a number of data terminals over which signals for transferring data are provided for each of computer bus 120 and peripheral bus 140. However, in this embodiment, peripheral bus 140 is a serial bus, and therefore, is coupled through a serializer-deserializer 114 (mounted on board 110) to host adapter 112. Such a serializer-deserializer, commonly referred to as "SERDES" provides the following functions: receive parallel data, convert to a serial bit stream and transmit the serial bit stream, and vice versa (receive a serial bit stream, convert to parallel data, and transmit the parallel data). Such a SERDES may also be included, depending on the implementation, in a peripheral device 131. An SERDES chip that can support the "full speed" rate for Fibre Channel, 1 Giga bits per second can be used (e.g. the SERDES available from Vitesse, Inc can be used). Host adapter 112 is also coupled to an oscillator 110C (FIG. 2A) that provides a clock signal for use by host adapter 112.

Host adapter 112 couples a number of peripheral devices (e.g. peripheral devices 131 and 132, such as a disk drive and a bridge to a SCSI device) to a system memory 164 inside a personal computer in the following manner. Specifically, host processor 161 executes software (in the form of a device driver that is programmed into a system memory 164 (FIG. 2A) to transfer data to and from peripherals 131 and 132 via host adapter 1 12. Note that although only two peripheral devices are illustrated, any number of peripheral devices (e.g. 128 devices) may use h ost adapter 112 to access system memory 164. The device driver (e.g. formed by an operating system specific module (OSM) and a hardware interface module (HIM) of the type described in, U.S. Pat. No. 5,659,690 by Stuber et al that was incorporated by reference above) provides instructions for the data transfer to host adapter 112 in the form of a number of transfer control blocks (TCBs) that are similar or identical to the Sequencer Control Blocks described above. Other than as described herein, the specific definition of a TCB is not a critical aspect of the invention.

During execution of the driver software, host processor 161 creates a number of TCBs in system memory 164, and informs host adapter 112 e.g. by incrementing the value in a predetermined a register (also called "Q-offset register") in host adapter 112. Sequencer module 115 polls the predetermined register, determines that there are one or more TCBs in system memory 164 that need to be executed. Thereafter, host adapter 112 downloads the TCBs (using a command module not shown in FIG. 2A), e.g. into adapter memory 111, and then starts executing commands indicated in the TCBs. Therefore, host adapter 112 accesses adapter memory 111 via a memory port interface 116 (FIG. 2A) as described in the U.S. patent application Ser. No. 09/089,044 (Pending), incorporated by reference above. In one implementation, host adapter 112 maintains 1500 TCBs in memory 111, and therefore allows data of 1500 contexts from a corresponding number (or a smaller number) of peripheral devices to be interleaved at any time during data transfer from system memory 164 (assuming no TCBs are used to transfer data to system memory 164).

In addition to memory port interface 116, host adapter 112 includes a bus interface module (also called "host interface module" and abbreviated as "HST") 117 that provides an interface between computer bus 120 and other modules inside host adapter 112. Similarly, host adapter 112 also includes a receive interface module (also referred to as "RIN") 123 that provides an interface for receipt of information from serializer-deserializer 113, and a send interface module (also called "SIN") 124 that provides an interface for transmission of information to serial-deserializer 113. The interface modules 117, 123 and 124 may be implemented in a manner similar or identical to the corresponding modules described in U.S. Pat. No. 5,659,690 (referenced above) unless one or more aspects of these modules are explicitly discussed below.

Host adapter 112 includes, in accordance with the invention, a data transfer module 114 that couples each of receive interface module 123 and send interface module 124 to host interface module 117. Data transfer module 114 includes a receive data path 118 for processing (in one implementation in a first-in-first-out manner) data received in one or more messages from peripheral bus 140 (via serializer-deserializer 113 and receive interface module 123), and transmission of the data to host interface module 117. Data transfer module 114 also includes a send data path 119 for processing data (in one implementation in a first-in-first-out manner) from host interface module 117 for transmission of the data in one or more messages onto peripheral bus 140 (via send interface module 124 and serializer-deserializer 113). Data transfer module 114 accesses system memory 164 via computer bus 120 at addresses defined in the scatter-gather lists. Host adapter 112 also includes a sequencer module 115 that controls and coordinates the transfer of data between computer bus 120 and peripheral bus 140. Sequencer module 115 is implemented by storage elements (not shown) and a RISC processor 150 (FIG. 2B) that is programmed with instructions to implement a multi-tasking protocol engine. Sequencer module 115 communicates with various modules, e.g. data transfer module 114 and host interface module 117 via an internal bus 121 (such as the CIO bus described in U.S. Pat. No. 5,659,690, or as described in U.S. patent application Ser. No. 09/088,812.

In one example, host processor 161 prepares a TCB that indicates a command to read data from a device 131. On receiving the TCB, host adapter 112 sends the command to device 131, and device 131 responds by sending data. On receipt of a message from peripheral bus 140, receive data path I 1 8 (FIG. 2A) temporarily stores the header to determine the destination in system memory 164 to which an associated payload is to be transferred. Specifically, in one implementation, receive data path 118 uses a predetermined field in the header (e.g. the sequence identifier of a Fibre Channel frame) to identify the just-described TCB that is associated with the received message. The TCB indicates a scatter gather element (as described in, for example, U.S. Pat. No. 5,659,690) that in turn contains an address in system memory 164 to which the payload is to be transferred. So, sequencer module 115 loads an address and a count (from the scatter gather element) into registers 117C (e.g. an address register and a count register) in host interface module 117. Thereafter, host interface module automatically transfers the data from receive data path 118 to system memory 164.

Figure 3A:
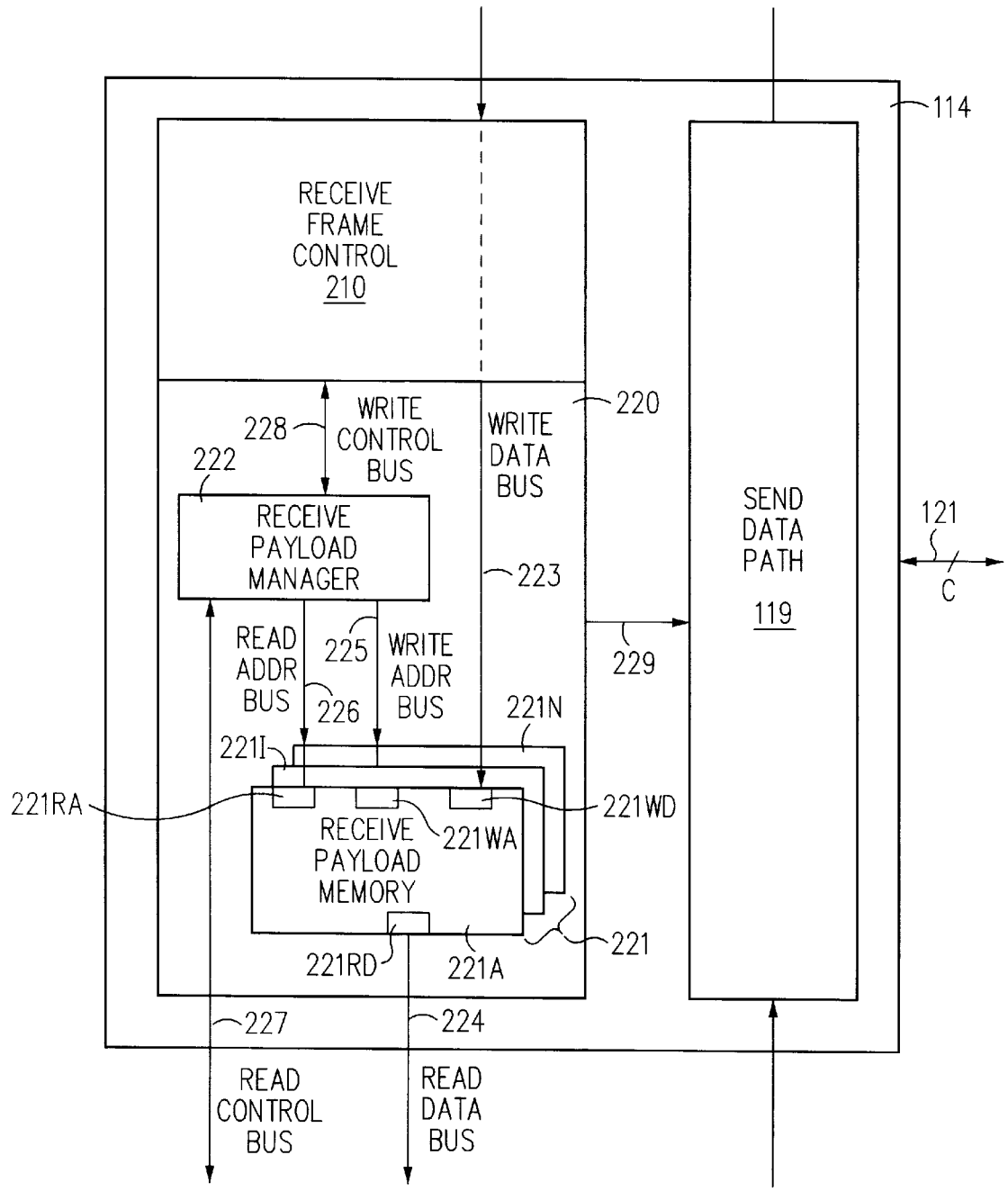
FIG. 3A illustrates, in a low level block diagram, various components included in the receive payload buffer and manager illustrated in FIG. 2B.

Receive data path 118 temporarily stores the payload of a message passing therethrough. For example, in one particular embodiment, receive data path 118 stores the payload in one or more fixed-size pages (e.g. pages 221 in FIG. 3A). Each page in receive data path 118 holds the data of at most one payload, even if a page has storage elements that are available to hold data from one or more additional payloads. If a page has fewer storage elements than the number required to hold the data from a single payload, then multiple pages are used to hold the data. Multiple pages that are used to hold data from the same context represent variable-sized "segments" (as viewed from computer bus 120) of memory. Specifically, each segment contains one or more pages that are used to hold the data of a single payload, or data of multiple payloads that all belong to the same context. The size of a segment can change, depending on the context, between a predetermined (nonzero) minimum and a predetermined maximum. Grouping of multiple pages into a segment as described herein allows data from the same context, although spread over multiple pages, to be transferred continuously (e.g. received or transmitted for as long as possible) over computer bus 120.

As described more completely below, each of data paths 118 and 119 (FIG. 2A) maintain, in accordance with the invention, a stream of data flowing at each of computer bus 120 and peripheral bus 140 for as long as possible. For example, receive data path 118 simultaneously transfers to computer bus 120 data that was previously received from peripheral bus 140, while additional data is being transferred to receive data path 118 from peripheral bus 140. Similarly, send data path 119 also simultaneously transfers to peripheral bus 140 data that was previously received from computer bus 120, while additional data is being transferred to send data path 1 19 from computer bus120. To maintain a stream of data flowing in from peripheral bus 140, receive data path 118 enables the receipt of additional data from peripheral bus 140, as soon as memory (included in receive data path 118) is available to hold the additional data. If the additional data is within the same context as the previously-received data, receive data path 118 transfers the additional data in tandem with the previously-received data, thereby to maintain a stream of data flowing on to computer bus 120 for as long as possible.

In one embodiment, each data path 118 and 119 includes two or more circuits that operate simultaneously, thereby to provide pipelined processing. Specifically, receive data path 118 includes a control circuit (hereinafter "receive frame control," abbreviated as "RFC") 210 (FIG. 2B) that analyzes the header of each message received from peripheral bus 140, and a storage circuit (hereinafter "receive payload buffer and manager," abbreviated as "RPB") 220 that temporarily stores the payload. Similarly, send data path 119 includes a storage circuit (hereinafter "send payload buffer and manager," abbreviated as "SPB") 240 that temporarily stores the data received from computer bus 120, and a control circuit (hereinafter "send frame control," abbreviated as "SFC") 230 prepares the header of a message containing the payload to be transmitted on peripheral bus 140. Two or more circuits (e.g. circuits 210, 220 or circuits 230, 240) that operate simultaneously in a pipelined manner speed up the processing of messages as described herein, when compared to using a single circuit of the prior art.

RFC 210 has an input bus (hereinafter "message input bus") 214 (FIG. 2B) that is coupled (via receive interface module 123) to peripheral bus 140, for receipt of messages therefrom. RFC 210 also has a first data bus (hereinafter "write data bus") 223 and a first control bus (hereinafter "write control bus") 228 that are both coupled to RPB 220. On receipt of a message from message input bus 214, RFC 210 stores the header and compares (as illustrated by act 312 in FIG. 3C) one or more fields in the header with values in certain registers. For example, RFC 210 in one implementation compares values in a header H2 with values in an expected header buffer (unlabeled, see FIG. 3B), and sets an event flag (also unlabeled) to alert sequencer module 115 (FIG. 2A) if there is a mismatch in a field. For the first message received from peripheral bus 140 after power-up, the expected header buffer has uninitialized values (e.g. value 0), and therefore RFC 210 sets the event flag indicating a mismatch (as illustrated by act 315 in FIG. 3C). Moreover, RFC 210 also finds a mismatch if there is an error in the received header, thereby flagging the error ahead of the receipt of a CRC checksum typically located at the end of a message (after the payload).

Figure 2A:
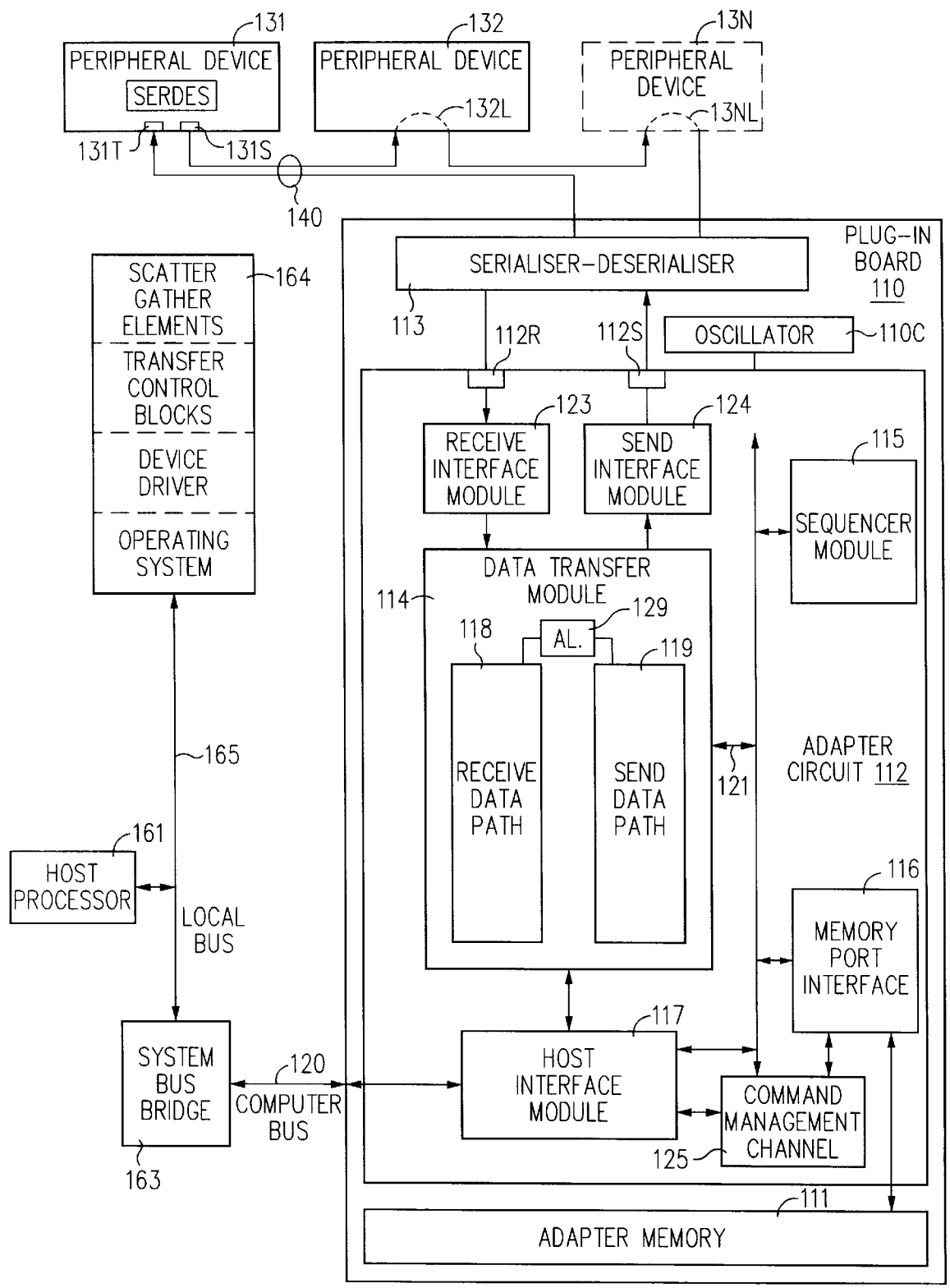
FIGS. 2A and 2B illustrate, in a high level block diagram and an intermediate level block diagram respectively, a host adapter in one embodiment of this invention.

Sequencer module 115 polls (as illustrated by act 321 in FIG. 3D) various registers in the various modules, including the event flag in RFC 210, and performs various actions depending on the type of mismatch. For example, if the header received by RFC 210 has the same value in the TCB field, then sequencer module drives appropriate signals to other modules, e.g. to SFC 119 to close a sequence (as defined in the Fibre Channel protocol). As another example, if the header received by RFC 210 has a different value in the TCB field, then sequencer module 115 determines that a context switch has occured, and performs any related operations. For example, sequencer module 115 may copy a TCB currently being used by RFC 210 to adapter memory 111 (FIG. 2A) for further processing at a later time . Simultaneous with such operations of sequencer module 115, RFC switches context and starts receiving messages from another peripheral device (e.g. device 132 in FIG. 2A). Sequencer module 115 also updates values in various modules, e.g. stores new scatter-gather values in registers 117N of host interface module 117, and new values in expected header buffer of RFC 210. Sequencer module 115 obtains the new scatter-gather values from a new TCB that is retrieved from adapter memory 111 using the sequence identifier from the just-received header as a pointer to identify the new TCB. After updating of the expected header buffer, RFC 210 performs another comparison between the expected header buffer and the just-received header, and another mismatch indicates an error. If there is a match, sequencer module 115 sets up (as illustrated by act 323 in FIG. 3D) various registers for transmission (e.g. by DMA) of the payload associated with the received header to system memory 164 (FIG. 2A). Specifically, sequencer module 115 loads an address and a count (from the scatter gather element associated with the TCB) into registers 117N (e.g. an address register and a count register) to be used during transmission of the just-described payload. Such operations of sequencer module 115 are not critical aspects of the invention.

In addition to processing the header from a message, RFC 210 passes the payload to write data bus 223, and simultaneously drives a first control signal (hereinafter "write enable signal") active on write control bus 228 if there was a match (during the above-described comparison). In response to the active write enable signal, RPB 220 begins to store data from write data bus 223, and continues to store the data and increment an address signal on write address bus 225, on each clock cycle for as long as the write enable signal remains active. RPB 220 stops storing data from bus 223 when the write enable signal becomes inactive. In addition to the write enable signal, RFC 210 provides other control signals on write control bus 228, such as (1) a purge payload signal to indicate that a message containing the payload being stored by RPB 220 has an error (such as a CRC error), and (2) an end of context signal to indicate that the current payload is the last payload of a context. In response to the purge payload signal, RPB 220 resets pointers to values prior to the write enable signal becoming active, thereby to effectively purge the payload. In response to the end of context signal, RPB 220 notes the identity of the storage element, for use in changing the context during transmission of the stored data to computer bus 120. Specifically, in one embodiment, RPB 220 uses the noted identity as a "barrier" between payloads of different contexts, e.g. RPB 220 uses the barrier to allow transmission of the stored data to proceed only up to the barrier. Therefore, at the end of transmission of every payload, RPB 220 checks whether the next payload belongs to the same context as the current payload, and if so, removes the barrier, and treats the next payload as continuous data with the current payload, e.g. transmits the data of the two successive payloads in a continuous manner.

Figure 2B:
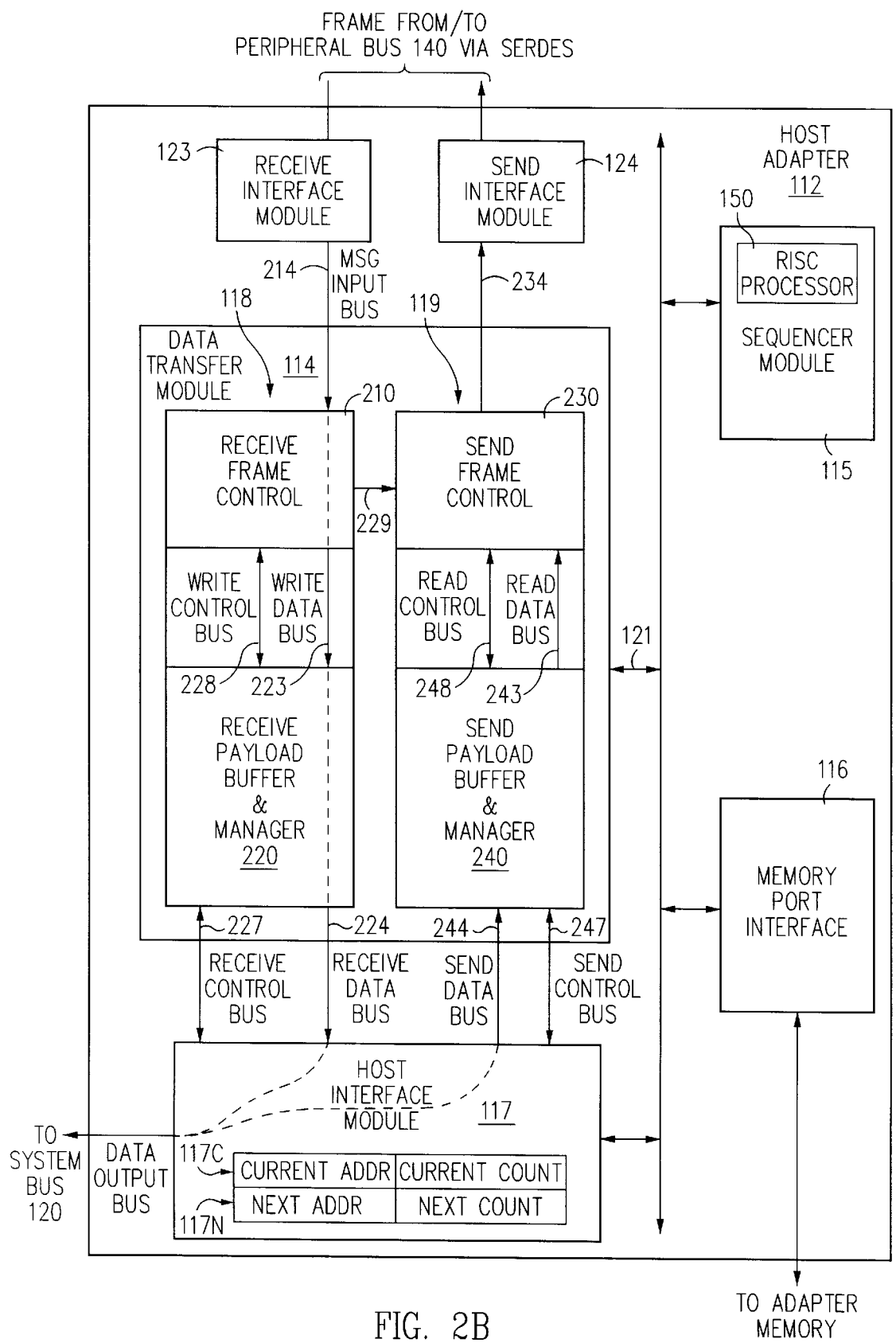

In this embodiment, RPB 220 (FIG. 2B) has a second data bus (hereinafter "receive data bus") 224 and a second control bus (hereinafter "receive control bus") 227 that are both coupled to host interface module 117 (FIG. 2B). Host interface module 117 drives a second control signal (hereinafter "receive enable signal") active to indicate that module 117 is latching data from receive data bus 224 on every rising edge of the clock cycle, and incrementing a signal on read address bus 226. In response to the active receive enable signal, RPB 220 begins to pass previously-stored data on to receive data bus 224, and continues to pass data on each clock cycle for as long as the receive enable signal remains active. RPB 220 stops passing data to bus 224 when the receive enable signal becomes inactive. As noted above, during the passage of stored data to bus 224, RPB 220 drives a third control signal (hereinafter "context done" signal) active if RPB 220 received the end of context signal during storage of data to the current the storage location. Host interface module 117 uses the context done signal to change the destination address of the data being transferred, e.g. by switching scatter gather elements.

Specifically, in response to the context done signal being active, host interface module 117 stops using a first group of storage elements 117C and starts using a second group of storage elements 117N that contain the destination address for the currently-received data to be transferred in the next cycle. In one specific implementation, each of groups 117C and 117N includes a scatter gather element that is held in two storage elements: a first storage element to hold an address in system memory 164, and a second storage element to hold a count indicating the amount of data to be transferred to system memory 164. Note that host interface module 117 begins using second group 117N even in the absence of a context done signal, e.g. when a total number of bytes indicated in the count of the first group 117C have been transferred. When beginning to use second group 117N, host interface module 117 informs sequencer module 115 that a new scatter gather element needs to be loaded into first group 117C. In response, sequencer module 115 (FIG. 2B) updates the values in first group 117C for use by host interface module 117 in future e.g. when the amount of data indicated by the count in second group 117N has been transferred (or at the end of another context). Therefore, host interface module 117 transfers data to system memory 164 (FIG. 2A) in a continuous manner, without any delay between the use of storage elements in groups 117C and 117N. A host interface module 117 having more than one group (in this example two groups 117C and 117N) as discussed herein has a headstart when transitioning between scatter gather elements, due to elimination of a delay in determining and loading a new scatter gather element (i.e. delay between completion of the use of a scatter gather element, and beginning the use of a new scatter gather element) that is otherwise present in the prior art.

In one implementation, when all the data for a context has been transferred, the peripheral device (e.g. device 131) sends a response frame (as per the Fibre Channel protocol) , indicating that the transfer completed normally. As noted above RFC 210 flags an event for sequencer module 115 because, the value in the just-received header's type field does not match the corresponding value in the expected header buffer. Sequencer module 115 responds to the response frame by checking if the scatter gather list has been completely used up, e.g. that the count has the value 0. If not, sequencer module 115 flags an underrun condition. Similarly, host interface module 117 flags an overrun condition when the scatter gather list has been completely used up and there is still additional data left for this context in RPB 220.

As noted above, send data path 119 (FIG. 2B) includes a storage circuit (called "SPB") 240 that collects data that is received in a number of different sizes (depending on the counts in the scatter gather elements) into a continuous block of data for use as payload of a message to be transmitted on peripheral bus 140. Specifically, host interface module 117 includes a packing register (see FIG. 5B) that receives data from computer bus 120 (FIG. 2B) and packs the data into a chunk of a predetermined size, e.g. 8 bytes, and provides the chunk to storage circuit 240. In one implementation, SBP 240 has a third data bus (hereinafter "send data bus") 244 and a third control bus (hereinafter "send control bus") 247 that are both coupled to host interface module 117 (FIG. 2B). Host interface module 117 drives a fourth control signal (hereinafter "send enable signal") active to indicate that module 117 is passing data (in one or more chunks) from computer bus 120 to send data bus 244 on every rising edge of the clock cycle. In response to the active send enable signal, SPB 240 begins to store data from send data bus 244, and continues to store data on each clock cycle for as long as the send enable signal remains active. SPB 240 stops storing data from bus 244 when the send enable signal becomes inactive.

When a payload of data is available, SPB 240 passes the data to SFC 230. Specifically, SFC 230 has a fourth data bus (hereinafter "read data bus") 243 and a fourth control bus (hereinafter "read control bus") 248 that are both coupled to SPB 240. SPB 240 drives a fifth control signal (hereinafter "payload ready signal") active on read control bus 248 to indicate that a payload is available to be read onto read data bus 243. On receipt of the payload ready signal, SFC 230 creates a header using information from a TCB provided by sequencer module 115. Thereafter, SFC 230 passes the header to an output bus (hereinafter "message output bus") 234 (FIG. 2B) that is coupled (via send interface module 124) to peripheral bus 140, for transmission of messages thereto. Next, if various conditions to initiate a transfer are met (e.g. if BB-credit for the device to receive the message is greater than zero, and if a transfer ready count held in register SFC_XFR_CNT and indicative of the data to be transferred is non-zero), SFC 230 drives a sixth control signal (hereinafter "read enable signal") on bus 248 to indicate that SFC 230 is reading data from read data bus 243 in every clock cycle for one complete payload. In this manner, SFC 230 passes a complete message (including a header and a payload as discussed above) to bus 234 that is coupled to peripheral bus 140. After sending the message, the existing BB-credit is decremented by one and the SFC_XFR_CNT is decremented by the number of data bytes sent in the message.

If just before transmission of the above-described message by SFC 230, host adapter 112 receives a "close" message from a peripheral device 131 that is the destination of the message, or if a timer in host adapter 112 expires without receipt of an R-ready from device 131, then host adapter 112 switches context, to use peripheral bus 140 to transmit data to another peripheral device 132. During such a context switch, host adapter 112 flushes the data that was to be transmitted to peripheral device 131 (e.g. by resetting pointers in SPB 240). At a later time, when device 131 is available, host adapter 112 refetches the data from system memory 164 and transmits the refetched data in the normal manner. To refetch the data, host adapter 112 loads into various registers (e.g. registers HADDR, HCNT in FIG. 5B) the values that were used to initially fetch the data, e.g. values that were saved in a snapshot of the registers as described in the related U.S. patent application Ser. No.

09/089,030 (Pending) incorporated by reference above. Instead of using a snapshot scheme, host adapter 112 may calculate the values indicative of the beginning of the data being flushed from the corresponding values indicative of the end of the data being flushed.

In one embodiment, each of RPB 220 and SPB 240 include a buffer formed by a number of storage elements, that are organized into a number of fixed-size pages. Specifically, RPB 220 (FIG. 3A) includes a buffer (also called "receive payload memory") 221 that is organized into a number of pages 221A–221N (wherein A≦I≦N, N being the total number of pages). Each of pages 221A–221N has a fixed number of storage elements equal in number to the number of storage elements in another of pages 221A–221N. In one implementation, the number N of pages 221A–221N in RPB 220 is greater than a minimum number of pages required to hold two payloads of the largest size that can be received from peripheral bus 140 (so that during normal operation RPB 220 holds at least two payloads simultaneously for a majority of the time). For example, when bus 140 conforms to the Fiber Channel specification, the payload has one of the following sizes: 128 bytes, 256 bytes, 512 bytes, 1024 bytes, and 2048 bytes (payload size of 2112 is not supported in this example). Therefore, the storage elements in buffer 221 are grouped (during initialization) into pages that have one of these 5 sizes, e.g. into a size of 512 bytes. So, if memory 221 has a total size of 4608 bytes, receive payload memory 221 is apportioned into nine pages that can together store a maximum of nine payloads (because each page holds at most one payload). So in this example, buffer 221's total size of 4608 bytes is greater than the minimum number 4096 by the size of 1 page, i.e. 512 bytes in this example.

Receive data path 118 uses eight of the nine pages as follows: 4 pages for each payload (2 Kbytes/payload), and causes the issue of two receiver ready (also called "R-ready") messages (via SFC 230) to each of two peripheral devices 131 and 132 at power up. Thereafter, RPB 220 receives and buffers two payloads (generated by devices 131 and 132 of FIG. 2A in response to the two R-readys). Receive data path 118 uses the ninth page to issue a receiver ready message as soon (after power-up) as 3 pages of data are transferred to computer bus 120 (because the ninth page is used with the 3 pages to form the 4 pages required for a payload). Soon thereafter, RPB 220 may start receiving a third payload in the ninth page (and in the 3 pages), while transmitting data from the fourth page of the first payload. Note that at this time, RPB 220 holds, in buffer 221, a portion of the first payload, the second payload, and a portion of the third payload. Note also, that each of three payloads can be from three different peripheral devices (i.e. three different contexts), with RPB 220 maintaining two barriers, one between each of two successive payloads. Alternatively, all three payloads can be from the same context, in which case RPB 220 does not maintain a barrier between the three payloads (e. g. all three payloads are transmitted in a continuous manner as a single data stream). In this manner, RPB 220 simultaneously maintains a flow of data at each of computer bus 120 and peripheral bus 140 for as long as possible. Although RPB 220 has 9 pages in this implementation, RFC 210 has only 8 buffers for holding headers.

When computer bus 120 conforms to the PCI protocol, under the best-case conditions (i.e. 0-latency, 0-wait state, 64-bit wide bus, operated at 33 MHz), and peripheral bus 140 conforms to the Fibre Channel protocol (operated at 26 MHz) one implementation of host adapter 112 has a lead time over PCI of 1.9 microseconds, computed as (30 nanoseconds*64 quad-words) to send a receiver ready to a peripheral device on bus 140, so that the peripheral device may send another 2K sized payload of data In this implementation, a lead time of at least this duration is required by host adapter 112 (implemented by a 0.6 micron CMOS process, with RISC processor 150 running at 53 Mhz based on a 106 Mhz clock signal provided by oscillator 110C) to maintain a stream of data flowing from bus 140 to bus 120 for as long as possible. However, in other implementations, the specific duration of lead time may be different, depending on several factors, such as speed of host adapter 112, speed of peripheral bus 140 and speed of peripheral devices 131 and 132.

Moreover, in this implementation, the total number of storage elements in SPB 240 is greater than or equal to the number required to hold two payloads of the largest size that can be transmitted on peripheral bus 140 (again so that during normal operation SPB 240 holds at least two payloads simultaneously for a majority of the time). So, in the above-described example, SPB 240 includes two pages of 2048 bytes each. Note that only two pages are adequate for SPB 240 to ensure that SPB 240 holds at least two payloads simultaneously for a majority of the time, if system memory 164 provides data to host adapter 112 (FIG. 2A) at any time (i.e. in an "on-demand" manner). As computer bus 120 is normally faster, and less busy than peripheral bus 140, this is a typical situation for many personal computers.

In one specific implementation, the size of each page 221I is at least approximately half way between the maximum size and the minimum size of the payload being received on peripheral bus 140. Therefore, in the above-described Fibre Channel example, each page 221I has a size of 512 bytes. Moreover, in this implementation, the total number N of pages 221A–221N is at least twice the number P of pages required to hold the maximum-sized payload. In the above-described Fibre Channel example, the maximum-sized payload has a size of 2048 bytes, and therefore P is 4, and N is greater than 8 (e.g. 9). In this implementation, the pages in each of RPB 220 and SPB 240 are physically implemented using a single ported, 64 rows×66 bits wide asynchronous random access memory. Moreover, in this implementation, data is transferred between host interface module 117 to the payload buffer on a 66 bit wide data bus (64 data bits +1 odd parity bit for low 32 bits and 1 for high 32 bits). The read data is transferred from the payload buffer to the SFC block on a 33 bit wide data bus (32 data bits +1 odd parity bit), and was transferred from host interface module 117.

Receive payload memory 221 has a number of write data terminals 221WD that are coupled by a write data bus 223 to the above-described peripheral bus 140. Receive payload memory 221 saves the data received on write data terminals 221WD in a storage element identified by an address received on a number of write address terminals 221WA of receive payload memory 221. Receive payload memory 221 also has a number of read data terminals 221RD that are coupled by a receive data bus 224 to a system bus 120. Receive payload memory 221 provides, on read data terminals 221RD, data that is currently stored in a storage element identified by an address received on read address terminals 221RA, which data was previously received at write data terminals 221WD. In addition to the above-described memory 221, receive payload buffer and manager 220 also includes an address generation circuit (also referred to as "receive payload manager") that provides read and write addresses to receive payload memory 221 for storage and retrieval of data therein. Specifically, receive payload manager 222 has a read address bus 226 that is coupled to read address terminals 221RA, and a write address bus 225 (FIG. 3A) that is coupled to write address terminals 221WA. Receive payload manager 222 provides a write address signal on bus 225 in response to assertion of the above-described write enable signal on write control bus 228 by RFC 210.

Figure 3B:
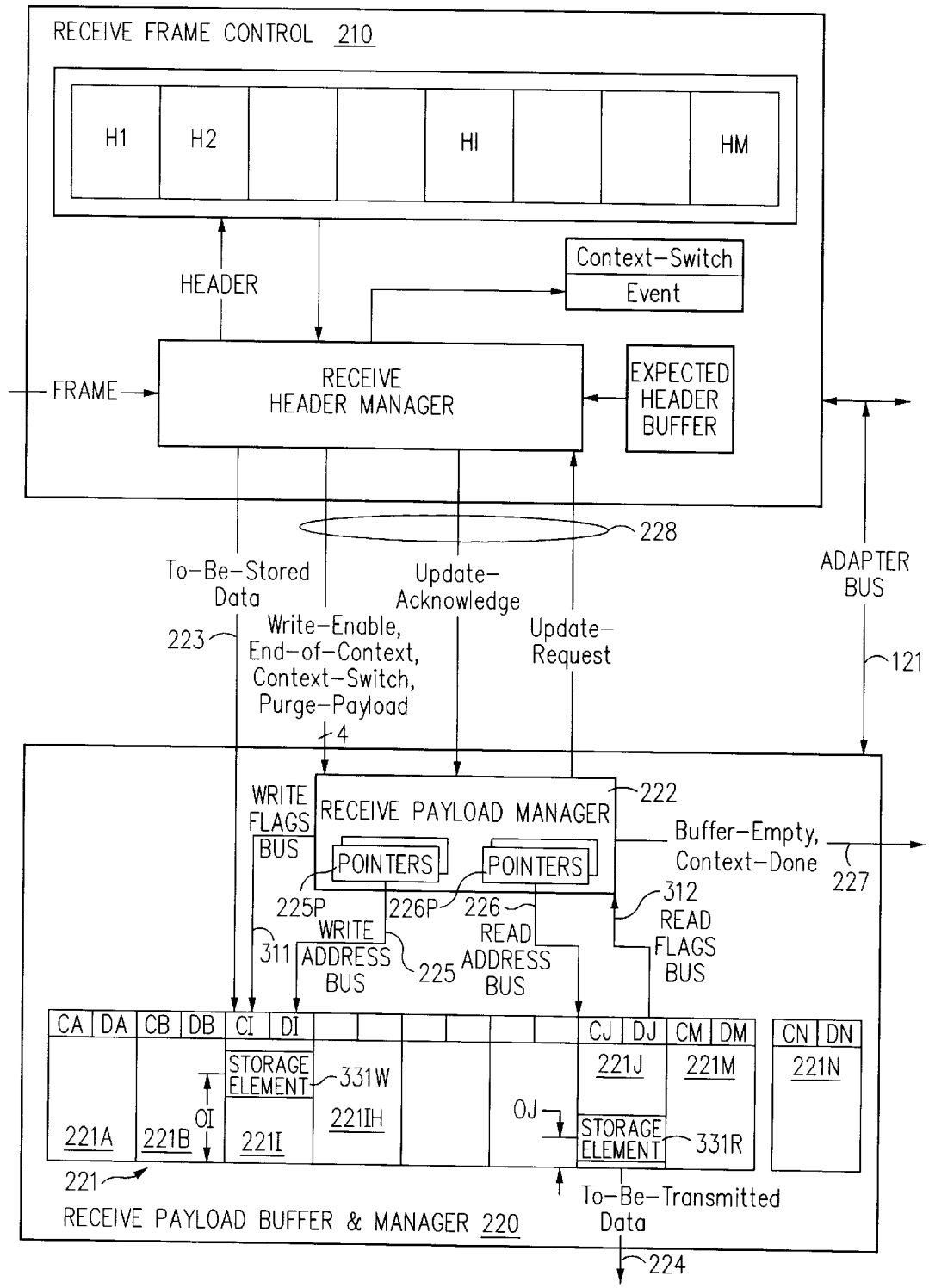
FIG. 3B illustrates, in another low level block diagram, various components included in one implementation of the receive frame control and the receive payload buffer and manager of FIG. 2B.
Figures 3C, 3D:
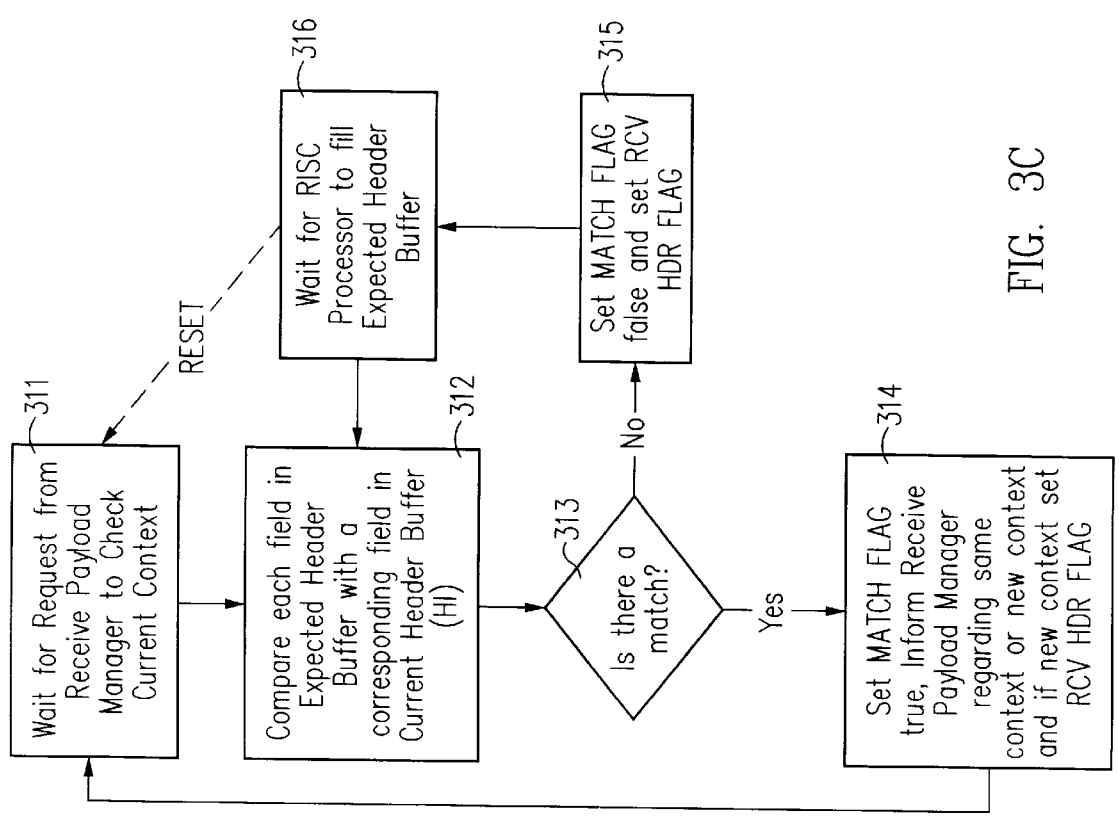
FIGS. 3C and 3D illustrate, in flow charts, operation of various components illustrated in FIG. 3B.

Receive payload memory 221 includes, in addition to pages 221A–221N, a corresponding number of pairs of storage elements (hereinafter "status storage elements") CA-CN and DA-DN (FIG. 3B). Each pair of status storage elements CI and DI are associated with a corresponding page 221I, and maybe located physically adjacent to page 221I. Receive payload manager 222 stores in a first status storage element (also referred to as "end of payload" flag) CI, a signal indicative of the end of a payload from a message received on peripheral bus 140. Receive payload manager 222 uses the deassertion of the write enable signal (described above) to determine the end of a payload, and in response sets the end of payload flag CI for a page 221I that was currently being used to store the payload from write data bus 223. Receive payload manager 222 includes at least two groups of storage elements (hereinafter "address storage elements") 225P and 226P that are respectively coupled by write address bus 225 and read address bus 226 to the corresponding terminals 221WA and 221RD (discussed above in reference to FIG. 3A). Specifically, a first group of address storage elements (hereinafter "write pointers") 225P includes a first pointer (hereinafter "write page select pointer") that identifies a page 221 I, and a second pointer (hereinafter "write page address pointer") that identifies an offset OI of a storage element 331W (FIG. 3B) within page 221I at which data is to be stored from bus 223. In one embodiment, on deassertion of the write enable signal, receive payload manager 222 increments the write page select pointer, and resets the write page address pointer to zero, so that data from the next message is written into page 221I+1. When I reaches N, payload manager 222 does not increment, but rather sets I=A, thereby to write into each of pages 221A–221N in a "round-robin" fashion. Receive payload manager 222 also stores an active signal in a second status storage element (also referred to as "end of context" flag) DI, in response to the end of context signal becoming active on write control bus 228. As noted above, RFC 210 drives the end of context signal active to indicate that the context is about to change.

Receive payload manager 222 reads the signals stored in status storage elements CI and DI of a current page 221I via a read flags bus 312, and uses the read signals to generate the address signals stored in a second group of address storage elements (hereinafter "read pointers") 226P and supplied to read address bus 226. The read pointers 226P include includes a third pointer (hereinafter "read page select pointer") that identifies a page 221J, and a fourth pointer (hereinafter "read page address pointer") that identifies an offset OJ of a storage element 331R (FIG. 3B) within page 221J from which data is to be supplied to bus 224 for transmission on computer bus 120. Specifically, receive payload manager 222 increments the read page select pointer and resets the read page address pointer to zero when the following two conditions are satisfied: (1) the end of message flag is set in the associated status storage element CJ and (2) the value of the signal held in the read page address pointer reaches a limit indicative of the number of valid bytes stored in page 221J. If the end of context flag is also set for the current page, payload manager 222 drives a context done signal active on receive control bus 227 when transmitting the last valid word of data on receive data bus 224.

Figure 4:
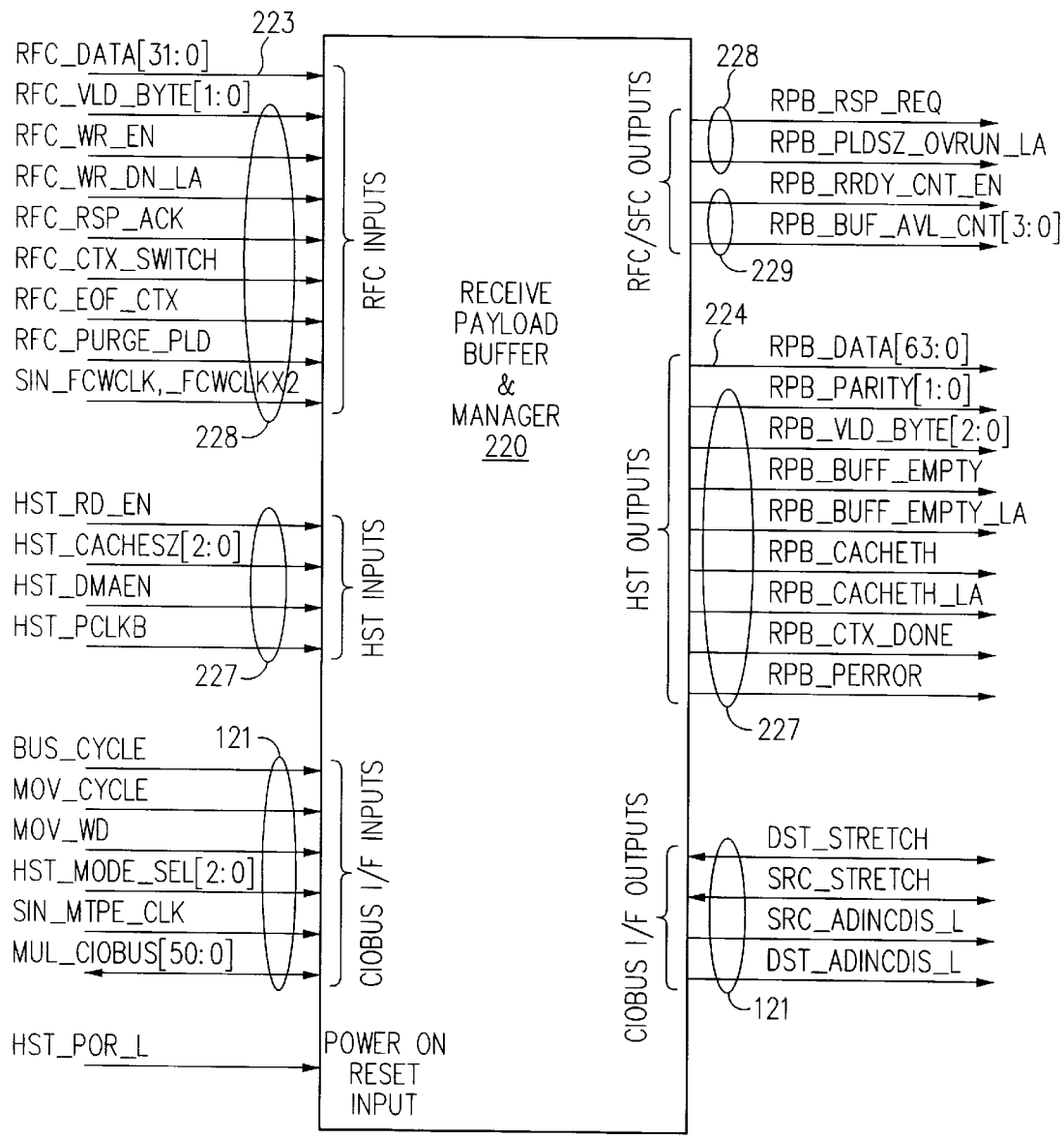
FIG. 4 illustrates, in a block diagram, the signals that are transmitted and received by one implementation of a receive payload buffer and a manager illustrated in FIG. 3B.

In one implementation, RPB 220 has a signal interface as illustrated in FIG. 4A, wherein several signals to/from manager 220 are named according to the convention "SRC_FUNC[_L]" wherein SRC denotes an abbreviation of the source of the signal, FUNC indicates a function to be performed in response to the signal, and L indicates an active low signal (if L is missing from a signal name, the signal is active high). For example, the signal RFC_WR_EN indicates an active high, write enable signal that is driven by receive frame control 210. The abbreviations used in the signal names are described in Table 1 below.

TABLE 1

| ABBREV-IATION | DESCRIPTION |
| --- | --- |
| RFC | Receive frame control 210 (FIG. 2B) |
| LIP | Loop initialization protocol for arbitrated loop address assignment in Fibre Channel, and LIP sequencer firmware implements the protocol. |
| SIN | Send interface module 124 for sending to peripheral bus 140 a message received from send data path 119 of FIG. 2B |
| HST | Host interface module 117 (FIG. 2B) |
| BUS | Internal bus 121 (FIG. 2B) located inside host adapter 112, also referred to as CIO bus or CCB bus depending on the implementation |
| MOV | Multiple sources, indicates block move is in progress |
| MUL | Miltiple sources, such as receive frame control 210, send path data 119, sequence or module 115, host interface module 117 and memory port 116 |
| TCTL | Test controller (not shown) |
| RIN | Receive interface module 123 for receiving a message from peripheral bus 140 and passing the message to receive data path 118 |
| RPB | Receive payload buffer and manager 220 (FIG. 2B) |
| DST | Multiple sources, indicates a signal from a destination of current instruction on bus 121 |
| SRC | Multiple sources, indicates a signal from a source of current instruction on bus 121 |

Various signals carried by buses 228, and 227 are illustrated in FIG. 4A and are described below in Tables 2A and 2B for one implementation.

TABLE 2A

| SIGNAL NAME | DESCRIPTION |
| --- | --- |
| RFC_DATA[31:0] | A 32-bit wide data bus used for transferring a double word from RFC 210 to RPB 220. |
| RFC_VLD_BYTE[1:0] | RFC 210 indicates to RPB 220 which bytes of RFC_DATA[31:0], are valid. Used to maintain an accurate count of the bytes stored in each page. A binary value of 2'b00 indicates that RFC_DATA[31:0] bits are valid; 2'b01 indicates that RFC_DATA[31:24] bits are valid; 2'10 indicates that RFC_DATA[31:16] are valid; 2'b11 indicates that RFC_DATA[31:8] are valid. |
| RFC_WR_EN | A write enable signal from RFC 210 which when asserted, indicates top the RPB 220 that the data on RFC_DATA [31:0]is valid and should be stored in receive payload memory 221. The signal is kept asserted during one complete payload transfer into receive payload memory 221. The deassertion edge of this signal activates a flag EOF_PLD (End of Payload) associated with the last page written to during the transfer. |
| RFC_WR_DN_LA | A look ahead signal for the "write done" event. The signal which is pulsed by RFC 201 one time period (indicated by signal |

TABLE 2A-continued

| SIGNAL NAME | DESCRIPTION |
|---|---|
| | RFC_CLK) prior to terminating the data transfer to RPB 220. |
| RFC_RSP_ACK | An acknowledge signal for signal RFC_RSP_REQ, and is asserted by RFC 210 to indicate that signals RFC_CTX_SWITCH, RFC_EOF_CTX and RFC_PURGE_PLD have been updated to reflect the state of the current/next payload. This signal is deasserted once signal RFC_RSP_REQ is deasserted. |
| RFC_CTX_SWITCH | A context-switch signal that is asserted by RFC 210 to indicate to RPB 220, that the current payload and the next payload belong to different contexts. If this signal is asserted and the current page read has the flag EOF_PLD set, then flag EOF_XFR is set for that page. |
| RFC_EOF_CTX | An end-of-context signal that is asserted by RFC 210 to indicate to RPB 220, that the current payload data being read is the last payload of a context. If this signal is asserted and the current page being read has the flag EOF_PLD set, then flag EOF_XFR is set for that page. |
| RFC_PURGE_PLD | A purge-payload signal that is asserted by RFC 210 to indicate to RPB 220, that an error (e.g. CRC error, Paylod Overrun, Header Error, Delimeter Error, etc.) was detected for the frame corresponding to the payload for which the information was requested. In response to this signal, RPB 220 purges the corresponding payload, by resetting pointers as described below. |
| RPB_BUF_AVL_CNT[3.0] | An available count signal generated by RPB 220 to perform flow control on the data being received from bus 140; specifically this signal indicates to send data path 119 are the number of pages available to accept a payload of data from peripheral bus 140. Send data path 119 indicates to peripheral device 131 the number of payloads that are acceptable based on the value indicated by RPB_BUF_AVL_CNT[3:0]. |
| RPB_RRDY_CNT_EN | A count enable signal that is generated by RPB 202 to indicate to send data 119 that space is now available in the receive payload memory to receive another payload and that a peripheral device 131 may send another message. This signal is active for one time period (indicated by signal RFC_CLK). |
| RPB_RSP_REQ | A response request signal that is asserted by RPB 220 to indicate that RFC 210 needs to update signals RFC_CTX_SWITCH, RFC_EOF_CTX and RFC_PURGE_PLD to reflect the state of the next payload and then assert the signal RFC_RSP_ACK to indicate completion of update. This signal is deasserted once signal RFC_RSP_ACK is asserted. |
| RPB_PLDSZ_OVRUN_LA | A look ahead signal for the payload size overrun event; the signal being pulsed by RPB 220 to indicate to RFC 210 that the transfer count for the current payload transfer is 4 short of the selected payload size; if signal RFC_WR_DN_LA has not been asserted by RFC 210. RFC 210 terminates the payload transfer (i.e, negates signal RFC_WR_EN) on the next clock (rising edge of signal RPC 210) if it senses this signal active. |

TABLE 2B

| SIGNAL NAME | DESCRIPTION |
|---|---|
| RPB_DATA[63:0] | This is a 64-bit wide data bus used by RPB 220 for transferring a quad-word to HST 117. |
| RPB_PARITY[1:0] | These signals are generated by RPB 220 to indicate to HST 117 the odd parity state for each double-word on the 64-bit wide data bus, RPB_DATA [63:0]. Bit 0 represents odd parity for the low double-word (RPB_DATA[31:0]) and bit 1 represent odd-parity for the high double word (RPB_DATA[63:32]). Note, the parity bit only covers the valid bytes. |
| RPB_BUFF_EMPTY | A status signal generated by RPB 220 to indicate that for the current context, there are no available left to be read by the HST block. The HST data module considers the state of this signal in starting and stopping a read transfer from the RPB block. |
| RPB_BUFF_EMPTY_LA | A status signal from RPB 220 to HST 117 indicating that for the current context, there is a minimum of 1 and a maximum of 8 available bytes left to be read by the HST 117. |
| RPB_CTX_DONE | RPB to HST Context Done, when asserted indicates to the HST block that the current page available for read process contains the last data of a context (i.e. its EOF_XFR flag is set). Once the HST data module detects that this signal is asserted, it waits for the current page data to be transferred to bus 224 and then posts a CTXDONE event for the sequencer to service. Once the CTXDONE event has been serviced by the sequencer (i.e. RPB_CTX_DONE and EOF_XFR flags are clear), this signal is deasserted. |
| RPB_VLD_BYTE[2:0] | A status signal from RPB 220 to HST 117 with a value that reflects the number of valid bytes contained in the current quad-word being read by the HST module. The state of these bits are used by the HST data module for packing/alignment of data bytes. |
| RPB_PERROR | A status signal from RPB 220 to HST 117 that is asserted upon detection of a parity error during read of payload data stored in the RPB. |

In one example, a peripheral device 131 indicates that the payload size is 128 bytes and the transfer ready count is 256 bytes (indicating that at most 256 bytes are to be transferred in a single sequence—formed by 2 data messages in this example). So, host adapter 112 receives two messages (both from device 131), and stores two headers in buffers H1 and H2, and two payloads in pages 221A and 221B. Note that even though 512 bytes are available in each page, only 128 bytes of each page are used (because only one payload is held in each page). Initially, end-of-payload flag CI of page 221A is set (in response to the write enable signal (e.g. signal RFC_WR_EN) going inactive between the two payloads. Flag CI acts as a barrier at the end of a page 221A because when active, RPB 220 drives a buffer-empty signal (e.g. signal RPB_BUFF_EMPTY) active, thereby to indicate to host interface module 117 that no more data is available for transfer to computer bus 120. As each message comes in, RFC 210 checks if all the values in the payload are zero, and if so saves the all-zero status for sequencer module 115. Moreover, RFC 210 also compares the values in buffer H1 with the corresponding values in the expected header buffer (unlabeled). Initially, for the first payload in page 221A there is no match, and sequencer module 115 (FIG. 2B) updates the expected header buffer as described above. Thereafter, on the next comparison, there is a match, and also as described above, sequencer module 115 updates values in other registers (such as group 117) to set up the DMA transfer to system memory 164.

RPB 220 starts transferring the payload in buffer 221A to host interface module 117 for transmission to computer bus 120 as soon as the page 221A is full. During the data transfer, RPB 220 drives an update request signal (e.g. signal RPB_RSP_REQ) to RFC 210 on bus 228 (FIG. 3B). RFC 210, after comparing buffer H2 with the expected header buffer, responds with an update acknowledge signal (e.g. signal RFC_RSP_ACK) indicating that control signals (e.g. an end-of-context signal RFC_EOF_CTX, context switch signal RFC_CTX_SWITCH, and purge payload signal RFC_PURGE_PLD) are valid on bus 228. In response to the update acknowledge signal, RPB 220 uses a control signal, e.g. the end-of-context signal being inactive to clear flag CI, and thereby lifts the barrier between payloads in pages 221A and 221B. Thereafter, RPB 220 continues to transfer the data from page 221B in tandem with the data transferred from page 221A (e.g. in a continuous manner), because the payloads in the two pages 221A and 221B belong to the same context. Then, RPB 220 again drives drives an update request signal (e.g. signal RPB_RSP_REQ) to RFC 210 on bus 228 (FIG. 3B).

Instead of the second message containing data, the second message may have an all-zero payload, e.g. if the second message is a response message (indicating an end of the data transmission). Sequencer module 115 determines that the all-zero data in page 221B need not be transferred, and informs RFC 210 that there is no need to transfer the payload to computer bus 120. RFC 210 in turn drives active the purge-payload signal (e.g. signal RFC_PURGE_PAYLOAD) to RPB 220. In response to the purge-payload signal, RPB 220 resets pointers (e.g. pointers 226P in FIG. 3B) thereby to skip over the transmission of the all-zero payload. Then, RPB 220 again drives drives an update request signal (e.g. signal RPB_RSP_REQ) to RFC 210 on bus 228 (FIG. 3B).

RFC 210, after comparing buffer H3 with the expected header buffer, finds a mismatch, raises an event for sequencer module 115, and sequencer module 115 updates the expected header buffer. Note that during this time, as pages 221A and 221B are emptied, RFC 210 drives a control signal to SEC 230 to send a receiver ready message on peripheral bus 140, each time a page becomes available (because in this example, each payload requires only one page). When RFC 210 drives the update acknowledge signal, the end-of-context signal RFC_EOF_CTX is active, and RPB 220 responds by clearing the end of payload flag CI, but flag DI stays set Therefore, when all data from page 221B has been transferred, RPB 220 drives a context done signal (e.g. signal RPB_CTX-DONE) to indicate to host interface module 117 that there is no more data available for this context. In response to the context done signal, module 117 raises an event for the sequencer module 115, and module 115 checks if the scatter gather list is at the end (i.e. that all data to be transferred has been transferred). If not, sequencer module 115 saves the values in various registers for use at a later time to complete the data transfer, and clears the end of context flag DI in page 221B. In response to flag DI being cleared, RPB 220 starts transferring data from the next page 221, and again drives an update request signal (e.g. signal RPB_RSP_REQ) to RFC 210 on bus 228.

In the above-described example, RFC 210 operates in a transmit mode, wherein RFC 210 does not wait to receive a complete message (i.e. the header and the payload) before acting on the message. Specifically, RFC 210 compares the message's header with the expected header buffer even before the complete message is received (i.e. during receipt of the payload), and drives various control signals (e.g. end of context signal) to RPB 220. Therefore, the transmit mode provides a headstart by allowing comparison even before a message is received (e.g. when a header of 24 bytes is received, although the message may have 1K bytes payload). In the case of a context switch, sequencer module 115 can complete the loading of registers to set up the DMA to system memory 164 even before the payload is completely received. RFC 210 can also operate in a hold mode, wherein RFC 210 waits for the entire message to be received, and performs a check (e.g. the cyclic redundancy check or a parity check) on the message before acting on the message.

In one embodiment, receive payload manager 222 includes a data flow control 413 that performs the acts illustrated in FIG. 4C. Specifically, data flow control 413 performs act 481 in response to a power on reset (also referred to as "POR"), and goes to act 482 and sets a flag START that is internal to data flow control 413. Thereafter, in act 483, data flow control 413 requests RFC 210 (FIG. 3B) for the next payload's context state information by driving a signal RPB_RSP_REQ active on a line of write control bus 228. Thereafter, data flow 413 waits in act 484 for a signal RFC_RFP_ACK to be driven active by RFC 210 on write control bus 228 thereby to indicate that the next payload's context state information is available. At that time, data flow control 413 performs act 485 and clears the flag REQUEST.

Next, data flow control 413 performs act 486 by checking the four flags A, B, C, D, and performs different actions depending on values of these flags. For example, when flag A is set, and flags B and D are clear, data flow control 413 performs act 487 and clears flag START, and thereafter returns to act 483. If all of flags A–D are clear, or if flags A, B, C are clear and flag D is set, data flow control 413 performs at 488 by waiting for the end of payload flag EOF_PLD to be set. When flag EOF_PLD is set, data flow control 413 performs act 489 by clearing flag EOF_PLD, and thereafter again checks the value of each of flags A–D in act 490. In act 490 if all of flags A–D are clear, data flow control 413 returns to act 483. If flag D is set and all of flags A–C are clear in act 490, data flow control 413 goes to act 492 (described below).

In act 486, if flags C and D are set and flags A and B are clear, data flow control 413 performs act 491 by setting flag LOOP1, and thereafter performs act 492 (described below). Also, in act 486, for all of the remaining values of flags A, B, C, D, or data control 413 performs act 492.

Figure 5A:
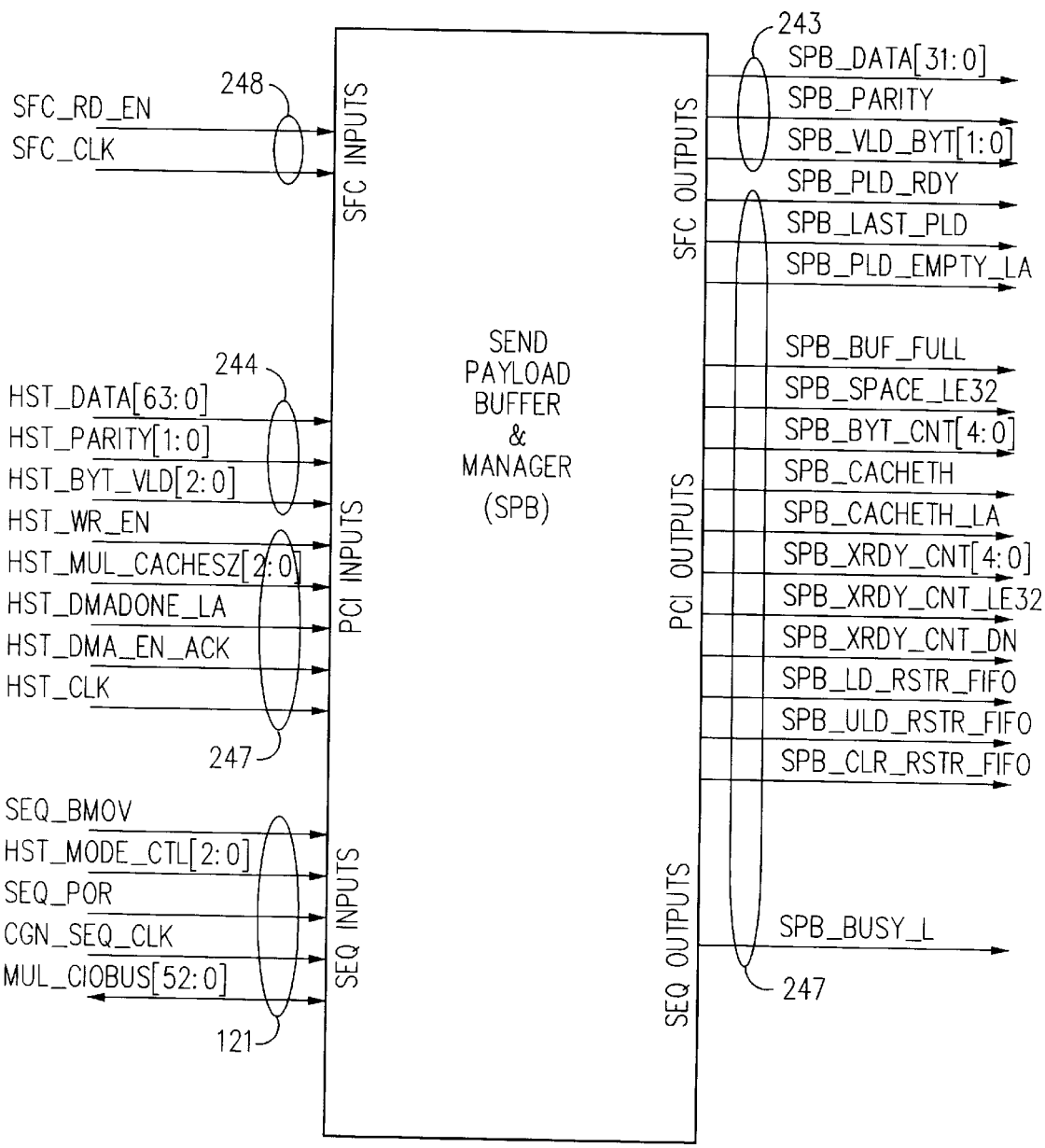
FIG. 5A illustrates, in a block diagram, the signals that are transmitted and received by one implementation of a send payload buffer and a manager illustrated in FIG. 2B.
Figure 5B:
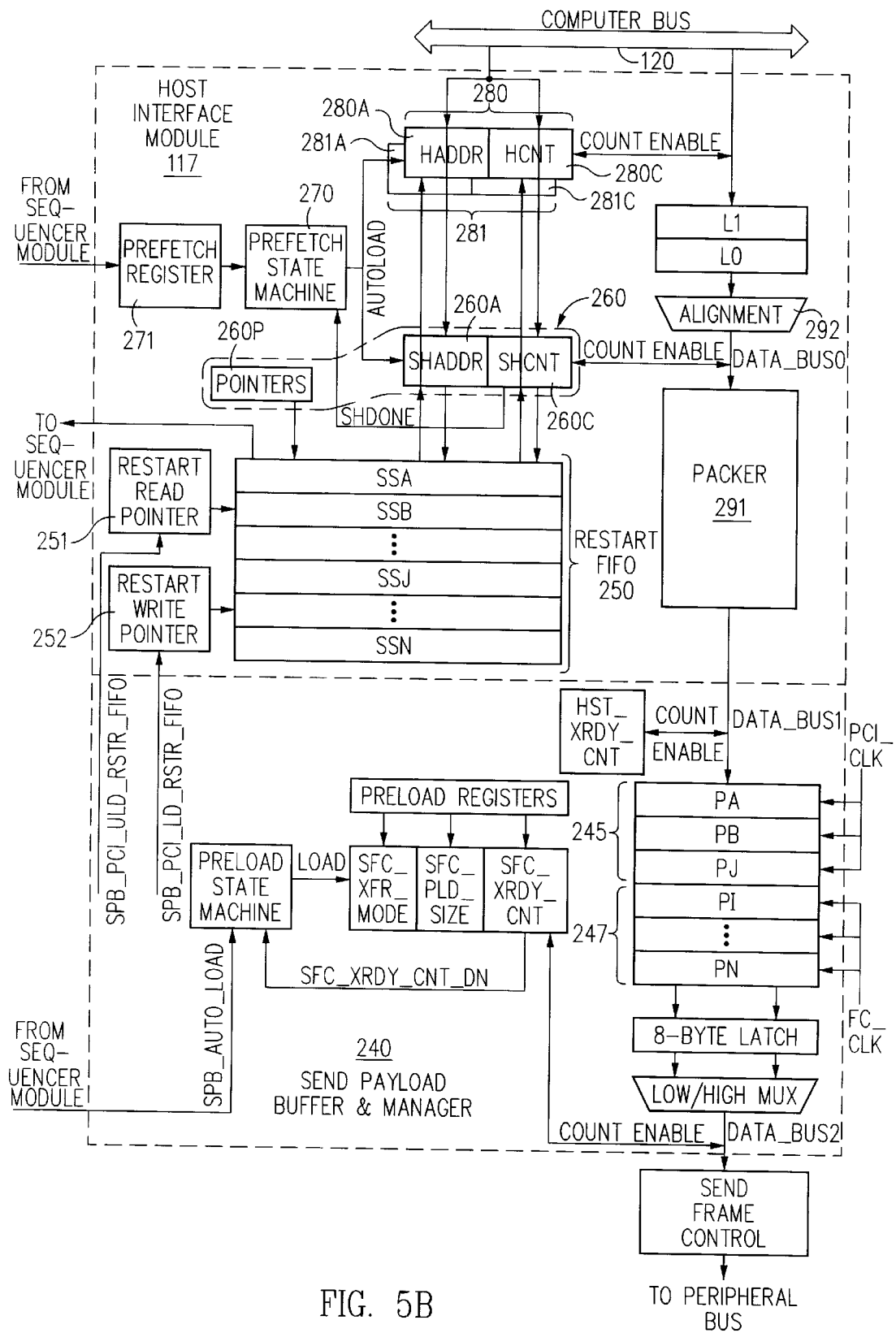
FIG. 5B illustrates, in a low level block diagram, various components included in the send payload buffer and manager illustrated in FIG. 2B.

The signals carried by buses 248, and 247 are illustrated in FIG. 5A and are described below in Tables 3A and 3B respectively.

TABLE 3A

| SIGNAL NAME | DESCRIPTION |
| --- | --- |
| SFC_RD_EN | SFC to SPB Read Enable, is a control signal indicating that while it is asserted, the SFC block will be latching SPB_DATA[31:0] on every rising edge of SFC_CLK. The signal is kept asserted during one complete payload read transfer from the send payload buffer. |
| SPB_DATA[31:0] | SPB to SFC Data [31:0], is a 32-bit wide data bus used for transferring a |

TABLE 3A-continued

| SIGNAL NAME | DESCRIPTION |
|---|---|
| | double word from the SPB block to the SFC block. |
| SPB_PARITY | SPB to SFC Parity, is the odd parity bit associated with the double-word currently on SPB_DATA [31:0]. |
| SPB_VLD_BYT[1:0] | SPB tp SFC Valid Byte [1:0], are the lower two bits of SFC_XRDY_CNT. While transferring the last payload of a sequence, the SFC block considers the value on these two bits in order to setup the Fill_Data_Bytes [1:0] in the F_CTL field of the header. For payload's other than the last one of a sequence, the SFC block ignores the value on these bits. If the bit value is 00, then of the last 4 bytes read from SPB, all are valid. If the bit value is 10, then of the last 4 bytes from SPB, two are valid. If the bit value is 11, then of the last 4 bytes read from SPB, three are valid. |
| SPB_PLD_RDY | SPB to SFC Payload Ready, indicates whether a payload of data is avaliable for the SPB block to read. |
| SPB_LAST_PLD | SPB to SFC Last Payload, is asserted when the last payload is made available to the SFC block for reading. During the course of a write data transfer from the HST data module into the SPB, if a DMADONE or a HST_XRDY_CNT_DN is encountered, the payload is marked as being the last payload of the sequence. |
| SPB_PLD_EMPTY_LA | SPB to SFC Payload Empty Look Ahead, is a status output indicating that for the current payload being read, only 4 unread bytes remain. |

TABLE 3B

| SIGNAL NAME | DESCRIPTION |
|---|---|
| HST_DATA[63:0] | HST to SPB Data [63:0], is a 64-bit wide data bus used for transferring a quad-word from the HST block to the SPB block. |
| HST_PARITY[1:0] | HST to SPB Parity [1:0] bits, reflect the odd parity state for each double word on the 64-wide data bus, HST_DATA [63:0]. Bit 0 represents odd parity for the low double word (HST_DATA[31:0]) and bit 1 represents odd-parity for the high double word (HST_DATA [32:0]/ |
| HST_VLD_BYT[2:0] | HST to SPB Valid Byte [2:0], indicates which bytes on HST_DATA [63:0] are valid. |
| HST_WR_EN | HST top SPB Write Enable is a control signal indicating that while it is asserted, the HST block will be transferring data into the SPB block bytes on every rising edge if HST_CLK. |
| SPB_BUF_FULL | SPB to HST Buffer Full, is a status output indicating that the send payload buffer does not have storage space left for any more data bytes. |
| SPB_SPACE_LES32 | SPB to HST Space Less/Equal to 32 bytes, is a status output indicating the send payload buffer has storage space less than or equal to 4 quad words (i.e. 32-bytes). |
| SPB_BYT_CNT[4:0] | SPB to HST Byte Count [4:0], are the lower 5 bits of the byte counter associated |

TABLE 3B-continued

| SIGNAL NAME | DESCRIPTION |
|---|---|
| | with the current page being written to by the HST. If the SPB_SPACE_LES32 signal is asserted, the HST module looks at this byte count value to determine when to stop fetching data from system memory. |
| SBP_CACHETH | SPB to HST Cache Threshold, is a status output indicating that the buffer storage space is at or above the ache line size selected in the configuration space CACHESIZE register. The HST block uses SPB_CACHETH as one of the decision terms on which a cache reference command may be issued when operating as a PCI bus master. |
| SBP_CACHETH_LA | SPB to HST Cache Threshold Look Ahead, is a status output indicating that the buffer storage space is at or above 2 quad-words + cache line size selected in the configuration space CACHESIZE register. The HST block uses SPB_CACHETH_LA as one of the decision terms on which a cache reference command may be issued when operating as a HST bus master. |
| SPB_XRDY_CNT_DN | SPB to HST Transfer Ready Count Done, is a status output indicating that the transfer ready count valueis 0. |
| SPB_XRDY_CNT_LE32 | SPB to HST Transfer Ready Count Less/Equal to 32 bytes, is a status output indicating that the transfer ready count value is less than or equal to 32 bytes. |
| SPB_XRDY_CNT[4:0] | SPB to HST Transfer Ready Count [4:0], are the lower 5 bits of the transfer ready counter. If the SPB_XRDY_CNT_LE32 signal is asserted, the HST module looks at this byte count value to determine when to stop fetching data from system memory. |
| SPB_LD_RSTR_FIFO | SPB to HST Load Restart FIFO, is asserted when the last row for a page is being written by the HST data module (except if DMADONE_LA is active during the write transfer). Note, at this time the SHADDR and SHCNT are pointing to the first byte that will be stored in the packing register which will eventually become the first byte entry of a new page. This signal prompts the host module to store the SHADDR, SHCNT and S/G pointer values into the restart FIFO. |
| SPB_ULD_RSTR_FIFO | SPB to HST Unload Restart FIFO, is asserted when SFC has emptied a page, This signal prompts the host module to increment the read pointer of the restart FIFO. |
| SPB_CLR_RSTR_FIFO | SPB to HST Clear Restart FIFO, is asserted when the CLR_BUFF bit within SPB is set by the sequencer. This signal prompt the host module to reset the read and write pointer of the restart of FIFO. |

In another example, host processor 161 indicates that data is to be transferred to peripheral device 131 (by sending a message). Peripheral device 131 responds by providing a transfer ready count, indicating that only 128 bytes at a time can be received by device 131. Host adapter 112 receives the transfer ready count in a payload in a page in RPB 220 (as discussed above), and sequencer module 115 reads the value of the transfer ready count from RPB 220 (through bus 121), and stores the value in one or more registers (also called "transfer ready registers", e.g. registers SFC_XRDY_CNT and HST_XRDY_CNT). The value in a transfer ready register is decremented when the corresponding data is received. For example, a first value in a first transfer ready register HST_XDY_CNT is decremented as data is received by host interface module 117, and a corresponding value (also called "shadow first value") in a second transfer ready register SFC_XRDY_CNT is decremented as data is read by SFC 230 and passed to peripheral bus 140. When the first value goes to zero, host interface module 117 stops fetching data (for the current context) from system memory 164, and starts fetching data for a second context (e.g. for peripheral device 132). The shadow first value in the second transfer ready register SFC_XRDY_CNT indicates the amount of data transferred to peripheral device 131. Therefore, at this time, a second value in first transfer ready register HST_XRDY_CNT has no relation whatsoever to the shadow first value in second transfer ready register SFC_XRDY_CNT. Specifically, the second value indicates the amount of data of the second context received from system memory 164, whereas the shadow first value indicates the amount of data of the first context transferred to peripheral device 131. If there is a stall during transfer of data of the first context, sequencer module 115 saves, for retransmission at a later time, the shadow first value, in addition to other values, as described in U.S. patent application Ser. No. 09/089,030 (Pending). So, when refetching data to recover from a previously stalled transfer for peripheral device 131, host adapter 112 refetches data from the location indicated by the second transfer ready register (instead of using the first transfer ready register that does not indicate data received by adapter 112 but flushed).

In a default mode (also called "hold mode"), SPB 240 fetches all the data necessary to form a single payload, i.e. the amount of data indicated by the transfer ready count before requesting SFC 230 to start transmitting (e.g. by driving signal SPB_PLD_RDY active). When the transfer ready count is larger than a page, SPB 230 waits to receive the required number of pages (e.g. 2 pages for a 1K payload), before informing SFC 230. In some cases, computer bus 120 may operate slowly, so that 512 bytes of data may be available in a page for transfer to peripheral bus 140, but is not transferred (in the hold mode). In another mode (called "transmit mode"), SPB 240 transfers the data to SFC 230 in payloads smaller than the transfer ready count, and appends one or more additional payloads if the data is received from computer bus 120 before completion of transmission of a previous payload on peripheral bus 140. In the above-described example, as soon as data for the first page becomes available, SPB 220 indicates to SFC 230 to start transmission of a message (including a header and the first page). If a second page of data becomes available before completion of transmission of the first page, SFC 230 appends the second page to the first page, and both pages are transmitted in the single message.

Although certain embodiments are described herein, numerous modifications and adaptations of the embodiments will be apparent to a person skilled in the art of designing host adapter circuits. Therefore, numerous modifications and adaptations of the embodiments described herein are encompassed by the attached claims.

APPENDIX G

```
File name:      rpb_debug_mux.v
Function:       This module muxes the debug traces.

module rpb_debug_mux ( debug_trace,
                       grp0_trace,
                       grp1_trace,
                       grp2_trace,
                       grp3_trace,
                       grp4_trace,
                       grp5_trace,
                       grp6_trace,
                       grp7_trace,
                       rpb_debug);
//**************************************************
// Input/Output Declarations
//**************************************************
`include "rpb.param"

input   [11:0]  grp0_trace;     // Group 0 debug trace
input   [11:0]  grp1_trace;     // Group 1 debug trace
input   [11:0]  grp2_trace;     // Group 2 debug trace
input   [11:0]  grp3_trace;     // Group 3 debug trace
input   [11:0]  grp4_trace;     // Group 4 debug trace
input   [11:0]  grp5_trace;     // Group 5 debug trace
input   [11:0]  grp6_trace;     // Group 6 debug trace
input   [11:0]  grp7_trace;     // Group 7 debug trace
input   [2:0]   rpb_debug;      // mux control output  [11:0]  debug_trace;    // rpb debug traces wire    [11:0]  debug_trace;

//**************************************************
// debug trace select
//**************************************************
assign #DLY debug_trace[11:0] =
                                (rpb_debug[2:0] == 3'b000) ? grp0_trace[11:0] :
                                (rpb_debug[2:0] == 3'b001) ? grp1_trace[11:0] :
                                (rpb_debug[2:0] == 3'b010) ? grp2_trace[11:0] :
                                (rpb_debug[2:0] == 3'b011) ? grp3_trace[11:0] :
                                (rpb_debug[2:0] == 3'b100) ? grp4_trace[11:0] :
                                (rpb_debug[2:0] == 3'b101) ? grp5_trace[11:0] :
                                (rpb_debug[2:0] == 3'b110) ? grp6_trace[11:0] :
                                (rpb_debug[2:0] == 3'b111) ? grp7_trace[11:0] :
                                grp0_trace[11:0];

endmodule

// design name: rpb_pbuf_ram
// options     : -n -i -e -t/tools/verilnet/translation_lib.t
//               -g/tools/verilnet/ -orpb_pbuf_ram.v
// levels      : level adap module rpb_pbuf_ram (di32, di31, di30, di29, di28, di27, di26, di25, di24,
    di23, di22, di21, di20, di19, di18, di17, di16, di15, di14, di13, di12,
    di11, di10, di9, di8, di7, di6, di5, di4, di3, di2, di1, di0, we_h8,
    we_h7, we_h6, we_h5, we_h4, we_h3, we_h2, we_h1, we_h0, we_l8, we_l7,
    we_l6, we_l5, we_l4, we_l3, we_l2, we_l1, we_l0, re8, re7, re6, re5, re4
    , re3, re2, re1, re0, do_h32, do_h31, do_h30, do_h29, do_h28, do_h27,
    do_h26, do_h25, do_h24, do_h23, do_h22, do_h21, do_h20, do_h19, do_h18,
    do_h17, do_h16, do_h15, do_h14, do_h13, do_h12, do_h11, do_h10, do_h9,
    do_h8, do_h7, do_h6, do_h5, do_h4, do_h3, do_h2, do_h1, do_h0, do_l32,
    do_l31, do_l30, do_l29, do_l28, do_l27, do_l26, do_l25, do_l24, do_l23,
    do_l22, do_l21, do_l20, do_l19, do_l18, do_l17, do_l16, do_l15, do_l14,
    do_l13, do_l12, do_l11, do_l10, do_l9, do_l8, do_l7, do_l6, do_l5, do_l4
    , do_l3, do_l2, do_l1, do_l0, ra05, ra04, ra03, ra02, ra01, ra00, ra15,
    ra14, ra13, ra12, ra11, ra10, ra25, ra24, ra23, ra22, ra21, ra20, ra35,
    ra34, ra33, ra32, ra31, ra30, ra45, ra44, ra43, ra42, ra41, ra40, ra55,
    ra54, ra53, ra52, ra51, ra50, ra65, ra64, ra63, ra62, ra61, ra60, ra75,
    ra74, ra73, ra72, ra71, ra70, ra85, ra84, ra83, ra82, ra81, ra80);
output do_h32, do_h31, do_h30, do_h29, do_h28, do_h27, do_h26, do_h25,
    do_h24, do_h23, do_h22, do_h21, do_h20, do_h19, do_h18, do_h17, do_h16,
    do_h15, do_h14, do_h13, do_h12, do_h11, do_h10, do_h9, do_h8, do_h7,
    do_h6, do_h5, do_h4, do_h3, do_h2, do_h1, do_h0, do_l32, do_l31, do_l30
    , do_l29, do_l28, do_l27, do_l26, do_l25, do_l24, do_l23, do_l22, do_l21
    , do_l20, do_l19, do_l18, do_l17, do_l16, do_l15, do_l14, do_l13, do_l12
    , do_l11, do_l10, do_l9, do_l8, do_l7, do_l6, do_l5, do_l4, do_l3, do_l2
    , do_l1, do_l0;
input di32, di31, di30, di29, di28, di27, di26, di25, di24, di23, di22,
    di21, di20, di19, di18, di17, di16, di15, di14, di13, di12, di11, di10,
    di9, di8, di7, di6, di5, di4, di3, di2, di1, di0, we_h8, we_h7, we_h6,
    we_h5, we_h4, we_h3, we_h2, we_h1, we_h0, we_l8, we_l7, we_l6, we_l5,
    we_l4, we_l3, we_l2, we_l1, we_l0, re8, re7, re6, re5, re4, re3, re2,
    re1, re0, ra05, ra04, ra03, ra02, ra01, ra00, ra15, ra14, ra13, ra12,
    ra11, ra10, ra25, ra24, ra23, ra22, ra21, ra20, ra35, ra34, ra33, ra32,
    ra31, ra30, ra45, ra44, ra43, ra42, ra41, ra40, ra55, ra54, ra53, ra52,
    ra51, ra50, ra65, ra64, ra63, ra62, ra61, ra60, ra75, ra74, ra73, ra72,
    ra71, ra70, ra85, ra84, ra83, ra82, ra81, ra80;
bushold \$1i1021 (.Z(do_h32));
bushold \$1i1022 (.Z(do_h31));
bushold \$1i1023 (.Z(do_h30));
bushold \$1i1024 (.Z(do_h29));
bushold \$1i1025 (.Z(do_h28));
```

```
bushold  \$1i1026  (.Z(do_h27));
bushold  \$1i1027  (.Z(do_h26));
bushold  \$1i1028  (.Z(do_h25));
bushold  \$1i1029  (.Z(do_h24));
bushold  \$1i1030  (.Z(do_h23));
bushold  \$1i1031  (.Z(do_h22));
bushold  \$1i1032  (.Z(do_h21));
bushold  \$1i1033  (.Z(do_h20));
bushold  \$1i1034  (.Z(do_h19));
bushold  \$1i1035  (.Z(do_h18));
bushold  \$1i1036  (.Z(do_h17));
bushold  \$1i1037  (.Z(do_h16));
bushold  \$1i1038  (.Z(do_h15));
bushold  \$1i1039  (.Z(do_h14));
bushold  \$1i1040  (.Z(do_h13));
bushold  \$1i1041  (.Z(do_h12));
bushold  \$1i1042  (.Z(do_h11));
bushold  \$1i1043  (.Z(do_h10));
bushold  \$1i1044  (.Z(do_h9));
bushold  \$1i1045  (.Z(do_h8));
bushold  \$1i1046  (.Z(do_h7));
bushold  \$1i1047  (.Z(do_h6));
bushold  \$1i1048  (.Z(do_h5));
bushold  \$1i1049  (.Z(do_h4));
bushold  \$1i1050  (.Z(do_h3));
bushold  \$1i1051  (.Z(do_h2));
bushold  \$1i1052  (.Z(do_h1));
bushold  \$1i1053  (.Z(do_h0));
bushold  \$1i1094  (.Z(do_l32));
bushold  \$1i1095  (.Z(do_l31));
bushold  \$1i1096  (.Z(do_l30));
bushold  \$1i1097  (.Z(do_l29));
bushold  \$1i1098  (.Z(do_l28));
bushold  \$1i1099  (.Z(do_l27));
bushold  \$1i1100  (.Z(do_l26));
bushold  \$1i1101  (.Z(do_l25));
bushold  \$1i1102  (.Z(do_l24));
bushold  \$1i1103  (.Z(do_l23));
bushold  \$1i1104  (.Z(do_l22));
bushold  \$1i1105  (.Z(do_l21));
bushold  \$1i1106  (.Z(do_l20));
bushold  \$1i1107  (.Z(do_l19));
bushold  \$1i1108  (.Z(do_l18));
bushold  \$1i1109  (.Z(do_l17));
bushold  \$1i1110  (.Z(do_l16));
bushold  \$1i1111  (.Z(do_l15));
bushold  \$1i1112  (.Z(do_l14));
bushold  \$1i1113  (.Z(do_l13));
bushold  \$1i1114  (.Z(do_l12));
bushold  \$1i1115  (.Z(do_l11));
bushold  \$1i1116  (.Z(do_l10));
bushold  \$1i1117  (.Z(do_l9));
bushold  \$1i1118  (.Z(do_l8));
bushold  \$1i1119  (.Z(do_l7));
bushold  \$1i1120  (.Z(do_l6));
bushold  \$1i1121  (.Z(do_l5));
bushold  \$1i1122  (.Z(do_l4));
bushold  \$1i1123  (.Z(do_l3));
bushold  \$1i1124  (.Z(do_l2));
bushold  \$1i1125  (.Z(do_l1));
bushold  \$1i1126  (.Z(do_l0));
rf64x66e2t urm3 (.DI65(di32), .DI64(di31), .DI63(di30), .DI62(di29), .DI61
(di28), .DI60(di27), .DI59(di26), .DI58(di25), .DI57(di24), .DI56(di23)
, .DI55(di22), .DI54(di21), .DI53(di20), .DI52(di19), .DI51(di18), .DI50
(di17), .DI49(di16), .DI48(di15), .DI47(di14), .DI46(di13), .DI45(di12)
, .DI44(di11), .DI43(di10), .DI42(di9), .DI41(di8), .DI40(di7), .DI39
(di6), .DI38(di5), .DI37(di4), .DI36(di3), .DI35(di2), .DI34(di1), .DI33
(di0), .DI32(di32), .DI31(di31), .DI30(di30), .DI29(di29), .DI28(di28),
.DI27(di27), .DI26(di26), .DI25(di25), .DI24(di24), .DI23(di23), .DI22
(di22), .DI21(di21), .DI20(di20), .DI19(di19), .DI18(di18), .DI17(di17)
, .DI16(di16), .DI15(di15), .DI14(di14), .DI13(di13), .DI12(di12), .DI11
(di11), .DI10(di10), .DI9(di9), .DI8(di8), .DI7(di7), .DI6(di6), .DI5
(di5), .DI4(di4), .DI3(di3), .DI2(di2), .DI1(di1), .DI0(di0), .WE1
(we_r ), .WE0(we_l3), .OE1(re3), .OE0(re3), .A5(ra35), .A4(ra34), .A3
(ra33), .A2(ra32), .A1(ra31), .A0(ra30), .D065(do_h32), .D064(do_h31),
.D063(do_h30), .D062(do_h29), .D061(do_h28), .D060(do_h27), .D059
(do_h26), .D058(do_h25), .D057(do_h24), .D056(do_h23), .D055(do_h22),
.D054(do_h21), .D053(do_h20), .D052(do_h19), .D051(do_h18), .D050
(do_h17), .D049(do_h16), .D048(do_h15), .D047(do_h14), .D046(do_h13), .D050
.D045(do_h12), .D044(do_h11), .D043(do_h10), .D042(do_h9), .D041(do_h8),
.D040(do_h7), .D039(do_h6), .D038(do_h5), .D037(do_h4), .D036(do_h3),
.D035(do_h2), .D034(do_h1), .D033(do_h0), .D032(do_l32), .D031(do_l31),
.D030(do_l30), .D029(do_l29), .D028(do_l28), .D027(do_l27), .D026
(do_l26), .D025(do_l25), .D024(do_l24), .D023(do_l23), .D022(do_l22),
.D021(do_l21), .D020(do_l20), .D019(do_l19), .D018(do_l18), .D017
(do_l17), .D016(do_l16), .D015(do_l15), .D014(do_l14), .D013(do_l13),
.D012(do_l12), .D011(do_l11), .D010(do_l10), .D09(do_l9), .D08(do_l8),
.D07(do_l7), .D06(do_l6), .D05(do_l5), .D04(do_l4), .D03(do_l3), .D02
(do_l2), .D01(do_l1), .D00(do_l0));
rf64x66e2t urm2 (.DI65(di32), .DI64(di31), .DI63(di30), .DI62(di29), .DI61
(di28), .DI60(di27), .DI59(di26), .DI58(di25), .DI57(di24), .DI56(di23)
, .DI55(di22), .DI54(di21), .DI53(di20), .DI52(di19), .DI51(di18), .DI50
(di17), .DI49(di16), .DI48(di15), .DI47(di14), .DI46(di13), .DI45(di12)
, .DI44(di11), .DI43(di10), .DI42(di9), .DI41(di8), .DI40(di7), .DI39
(di6), .DI38(di5), .DI37(di4), .DI36(di3), .DI35(di2), .DI34(di1), .DI33
(di0), .DI32(di32), .DI31(di31), .DI30(di30), .DI29(di29), .DI28(di28),
.DI27(di27), .DI26(di26), .DI25(di25), .DI24(di24), .DI23(di23), .DI22
(di22), .DI21(di21), .DI20(di20), .DI19(di19), .DI18(di18), .DI17(di17)
, .DI16(di16), .DI15(di15), .DI14(di14), .DI13(di13), .DI12(di12), .DI11
(di11), .DI10(di10), .DI9(di9), .DI8(di8), .DI7(di7), .DI6(di6), .DI5
(di5), .DI4(di4), .DI3(di3), .DI2(di2), .DI1(di1), .DI0(di0), .WE1
(we_h2), .WE0(we_l2), .OE1(re2), .OE0(re2), .A5(ra25), .A4(ra24), .A3
(ra23), .A2(ra22), .A1(ra21), .A0(ra20), .D065(do_h32), .D064(do_h31),
.D063(do_h30), .D062(do_h29), .D061(do_h28), .D060(do_h27), .D059
(do_h26), .D058(do_h25), .D057(do_h24), .D056(do_h23), .D055(do_h22),
.D054(do_h21), .D053(do_h20), .D052(do_h19), .D051(do_h18), .D050
```

```
       (do_h17),  .DO49(do_h16),  .DO48(do_h15),  .DO47(do_h14),  .DO46(do_h13),
      .DO45(do_h12),  .DO44(do_h11),  .DO43(do_h10),  .DO42(do_h9),  .DO41(do_h8)
      , .DO40(do_h7),  .DO39(do_h6),  .DO38(do_h5),  .DO37(do_h4),  .DO36(do_h3),
      .DO35(do_h2),  .DO34(do_h1),  .DO33(do_h0),  .DO32(do_l32),  .DO31(do_l31),
      .DO30(do_l30),  .DO29(do_l29),  .DO28(do_l28),  .DO27(do_l27),  .DO26
      (do_l26),  .DO25(do_l25),  .DO24(do_l24),  .DO23(do_l23),  .DO22(do_l22),
      .DO21(do_l21),  .DO20(do_l20),  .DO19(do_l19),  .DO18(do_l18),  .DO17
      (do_l17),  .DO16(do_l16),  .DO15(do_l15),  .DO14(do_l14),  .DO13(do_l13),
      .DO12(do_l12),  .DO11(do_l11),  .DO10(do_l10),  .DO9(do_l9),  .DO8(do_l8),
      .DO7(do_l7),  .DO6(do_l6),  .DO5(do_l5),  .DO4(do_l4),  .DO3(do_l3),  .DO2
      (do_l2),  .DO1(do_l1),  .DO0(do_l0));
      rf64x66e2t urm1 (.DI65(di32),  .DI64(di31),  .DI63(di30),  .DI62(di29),  .DI61
      (di28),  .DI60(di27),  .DI59(di26),  .DI58(di25),  .DI57(di24),  .DI56(di23)
      , .DI55(di22),  .DI54(di21),  .DI53(di20),  .DI52(di19),  .DI51(di18),  .DI50
      (di17),  .DI49(di16),  .DI48(di15),  .DI47(di14),  .DI46(di13),  .DI45(di12)
      , .DI44(di11),  .DI43(di10),  .DI42(di9),  .DI41(di8),  .DI40(di7),  .DI39
      (di6),  .DI38(di5),  .DI37(di4),  .DI36(di3),  .DI35(di2),  .DI34(di1),  .DI33
      (di0),  .DI32(di32),  .DI31(di31),  .DI30(di30),  .DI29(di29),  .DI28(di28),
      .DI27(di27),  .DI26(di26),  .DI25(di25),  .DI24(di24),  .DI23(di23),  .DI22
      (di22),  .DI21(di21),  .DI20(di20),  .DI19(di19),  .DI18(di18),  .DI17(di17)
      , .DI16(di16),  .DI15(di15),  .DI14(di14),  .DI13(di13),  .DI12(di12),  .DI11
      (di11),  .DI10(di10),  .DI9(di9),  .DI8(di8),  .DI7(di7),  .DI6(di6),  .DI5
      (di5),  .DI4(di4),  .DI3(di3),  .DI2(di2),  .DI1(di1),  .DI0(di0),  .WE1
      (we_h1),  .WE0(we_l1),  .OE1(re1),  .OE0(re1),  .A5(ra15),  .A4(ra14),  .A3
      (ra13),  .A2(ra12),  .A1(ra11),  .A0(ra10),  .DO65(do_h32),  .DO64(do_h31),
      .DO63(do_h30),  .DO62(do_h29),  .DO61(do_h28),  .DO60(do_h27),  .DO59
      (do_h26),  .DO58(do_h25),  .DO57(do_h24),  .DO56(do_h23),  .DO55(do_h22),
      .DO54(do_h21),  .DO53(do_h20),  .DO52(do_h19),  .DO51(do_h18),  .DO50
      (do_h17),  .DO49(do_h16),  .DO48(do_h15),  .DO47(do_h14),  .DO46(do_h13),
      .DO45(do_h12),  .DO44(do_h11),  .DO43(do_h10),  .DO42(do_h9),  .DO41(do_h8)
      , .DO40(do_h7),  .DO39(do_h6),  .DO38(do_h5),  .DO37(do_h4),  .DO36(do_h3),
      .DO35(do_h2),  .DO34(do_h1),  .DO33(do_h0),  .DO32(do_l32),  .DO31(do_l31),
      .DO30(do_l30),  .DO29(do_l29),  .DO28(do_l28),  .DO27(do_l27),  .DO26
      (do_l26),  .DO25(do_l25),  .DO24(do_l24),  .DO23(do_l23),  .DO22(do_l22),
      .DO21(do_l21),  .DO20(do_l20),  .DO19(do_l19),  .DO18(do_l18),  .DO17
      (do_l17),  .DO16(do_l16),  .DO15(do_l15),  .DO14(do_l14),  .DO13(do_l13),
      .DO12(do_l12),  .DO11(do_l11),  .DO10(do_l10),  .DO9(do_l9),  .DO8(do_l8),
      .DO7(do_l7),  .DO6(do_l6),  .DO5(do_l5),  .DO4(do_l4),  .DO3(do_l3),  .DO2
      (do_l2),  .DO1(do_l1),  .DO0(do_l0));
      rf64x66e2t urm0 (.DI65(di32),  .DI64(di31),  .DI63(di30),  .DI62(di29),  .DI61
      (di28),  .DI60(di27),  .DI59(di26),  .DI58(di25),  .DI57(di24),  .DI56(di23)
      , .DI55(di22),  .DI54(di21),  .DI53(di20),  .DI52(di19),  .DI51(di18),  .DI50
      (di17),  .DI49(di16),  .DI48(di15),  .DI47(di14),  .DI46(di13),  .DI45(di12)
      , .DI44(di11),  .DI43(di10),  .DI42(di9),  .DI41(di8),  .DI40(di7),  .DI39
      (di6),  .DI38(di5),  .DI37(di4),  .DI36(di3),  .DI35(di2),  .DI34(di1),  .DI33
      (di0),  .DI32(di32),  .DI31(di31),  .DI30(di30),  .DI29(di29),  .DI28(di28),
      .DI27(di27),  .DI26(di26),  .DI25(di25),  .DI24(di24),  .DI23(di23),  .DI22
      (di22),  .DI21(di21),  .DI20(di20),  .DI19(di19),  .DI18(di18),  .DI17(di17)
      , .DI16(di16),  .DI15(di15),  .DI14(di14),  .DI13(di13),  .DI12(di12),  .DI11
      (di11),  .DI10(di10),  .DI9(di9),  .DI8(di8),  .DI7(di7),  .DI6(di6),  .DI5
      (di5),  .DI4(di4),  .DI3(di3),  .DI2(di2),  .DI1(di1),  .DI0(di0),  .WE1
      (we_h0),  .WE0(we_l0),  .OE1(re0),  .OE0(re0),  .A5(ra05),  .A4(ra04),  .A3
      (ra03),  .A2(ra02),  .A1(ra01),  .A0(ra00),  .DO65(do_h32),  .DO64(do_h31),
      .DO63(do_h30),  .DO62(do_h29),  .DO61(do_h28),  .DO60(do_h27),  .DO59
      (do_h26),  .DO58(do_h25),  .DO57(do_h24),  .DO56(do_h23),  .DO55(do_h22),
      .DO54(do_h21),  .DO53(do_h20),  .DO52(do_h19),  .DO51(do_h18),  .DO50
      (do_h17),  .DO49(do_h16),  .DO48(do_h15),  .DO47(do_h14),  .DO46(do_h13),
      .DO45(do_h12),  .DO44(do_h11),  .DO43(do_h10),  .DO42(do_h9),  .DO41(do_h8)
      , .DO40(do_h7),  .DO39(do_h6),  .DO38(do_h5),  .DO37(do_h4),  .DO36(do_h3),
      .DO35(do_h2),  .DO34(do_h1),  .DO33(do_h0),  .DO32(do_l32),  .DO31(do_l31),
      .DO30(do_l30),  .DO29(do_l29),  .DO28(do_l28),  .DO27(do_l27),  .DO26
      (do_l26),  .DO25(do_l25),  .DO24(do_l24),  .DO23(do_l23),  .DO22(do_l22),
      .DO21(do_l21),  .DO20(do_l20),  .DO19(do_l19),  .DO18(do_l18),  .DO17
      (do_l17),  .DO16(do_l16),  .DO15(do_l15),  .DO14(do_l14),  .DO13(do_l13),
      .DO12(do_l12),  .DO11(do_l11),  .DO10(do_l10),  .DO9(do_l9),  .DO8(do_l8),
      .DO7(do_l7),  .DO6(do_l6),  .DO5(do_l5),  .DO4(do_l4),  .DO3(do_l3),  .DO2
      (do_l2),  .DO1(do_l1),  .DO0(do_l0));
      rf64x66e2t urm7 (.DI65(di32),  .DI64(di31),  .DI63(di30),  .DI62(di29),  .DI61
      (di28),  .DI60(di27),  .DI59(di26),  .DI58(di25),  .DI57(di24),  .DI56(di23)
      , .DI55(di22),  .DI54(di21),  .DI53(di20),  .DI52(di19),  .DI51(di18),  .DI50
      (di17),  .DI49(di16),  .DI48(di15),  .DI47(di14),  .DI46(di13),  .DI45(di12)
      , .DI44(di11),  .DI43(di10),  .DI42(di9),  .DI41(di8),  .DI40(di7),  .DI39
      (di6),  .DI38(di5),  .DI37(di4),  .DI36(di3),  .DI35(di2),  .DI34(di1),  .DI33
      (di0),  .DI32(di32),  .DI31(di31),  .DI30(di30),  .DI29(di29),  .DI28(di28),
      .DI27(di27),  .DI26(di26),  .DI25(di25),  .DI24(di24),  .DI23(di23),  .DI22
      (di22),  .DI21(di21),  .DI20(di20),  .DI19(di19),  .DI18(di18),  .DI17(di17)
      , .DI16(di16),  .DI15(di15),  .DI14(di14),  .DI13(di13),  .DI12(di12),  .DI11
      (di11),  .DI10(di10),  .DI9(di9),  .DI8(di8),  .DI7(di7),  .DI6(di6),  .DI5
      (di5),  .DI4(di4),  .DI3(di3),  .DI2(di2),  .DI1(di1),  .DI0(di0),  .WE1
      (we_h7),  .WE0(we_l7),  .OE1(re7),  .OE0(re7),  .A5(ra75),  .A4(ra74),  .A3
      (ra73),  .A2(ra72),  .A1(ra71),  .A0(ra70),  .DO65(do_h32),  .DO64(do_h31),
      .DO63(do_h30),  .DO62(do_h29),  .DO61(do_h28),  .DO60(do_h27),  .DO59
      (do_h26),  .DO58(do_h25),  .DO57(do_h24),  .DO56(do_h23),  .DO55(do_h22),
      .DO54(do_h21),  .DO53(do_h20),  .DO52(do_h19),  .DO51(do_h18),  .DO50
      (do_h17),  .DO49(do_h16),  .DO48(do_h15),  .DO47(do_h14),  .DO46(do_h13),
      .DO45(do_h12),  .DO44(do_h11),  .DO43(do_h10),  .DO42(do_h9),  .DO41(do_h8)
      , .DO40(do_h7),  .DO39(do_h6),  .DO38(do_h5),  .DO37(do_h4),  .DO36(do_h3),
      .DO35(do_h2),  .DO34(do_h1),  .DO33(do_h0),  .DO32(do_l32),  .DO31(do_l31),
      .DO30(do_l30),  .DO29(do_l29),  .DO28(do_l28),  .DO27(do_l27),  .DO26
      (do_l26),  .DO25(do_l25),  .DO24(do_l24),  .DO23(do_l23),  .DO22(do_l22),
      .DO21(do_l21),  .DO20(do_l20),  .DO19(do_l19),  .DO18(do_l18),  .DO17
      (do_l17),  .DO16(do_l16),  .DO15(do_l15),  .DO14(do_l14),  .DO13(do_l13),
      .DO12(do_l12),  .DO11(do_l11),  .DO10(do_l10),  .DO9(do_l9),  .DO8(do_l8),
      .DO7(do_l7),  .DO6(do_l6),  .DO5(do_l5),  .DO4(do_l4),  .DO3(do_l3),  .DO2
      (do_l2),  .DO1(do_l1),  .DO0(do_l0));
      rf64x66e2t urm8 (.DI65(di32),  .DI64(di31),  .DI63(di30),  .DI62(di29),  .DI61
      (di28),  .DI60(di27),  .DI59(di26),  .DI58(di25),  .DI57(di24),  .DI56(di23)
      , .DI55(di22),  .DI54(di21),  .DI53(di20),  .DI52(di19),  .DI51(di18),  .DI50
      (di17),  .DI49(di16),  .DI48(di15),  .DI47(di14),  .DI46(di13),  .DI45(di12)
      , .DI44(di11),  .DI43(di10),  .DI42(di9),  .DI41(di8),  .DI40(di7),  .DI39
      (di6),  .DI38(di5),  .DI37(di4),  .DI36(di3),  .DI35(di2),  .DI34(di1),  .DI33
      (di0),  .DI32(di32),  .DI31(di31),  .DI30(di30),  .DI29(di29),  .DI28(di28),
      .DI27(di27),  .DI26(di26),  .DI25(di25),  .DI24(di24),  .DI23(di23),  .DI22
      (di22),  .DI21(di21),  .DI20(di20),  .DI19(di19),  .DI18(di18),  .DI17(di17)
      , .DI16(di16),  .DI15(di15),  .DI14(di14),  .DI13(di13),  .DI12(di12),  .DI11
```

```
              (di11),  .DI10(di10),  .DI9(di9),  .DI8(di8),  .DI7(di7),  .DI6(di6),  .DI5
        (di5),  .DI4(di4),  .DI3(di3),  .DI2(di2),  .DI1(di1),  .DI0(di0),  .WE1
        (we_h8),  .WE0(we_18),  .OE1(re8),  .OE0(re8),  .A5(ra85),  .A4(ra84),  .A3
        (ra83),  .A2(ra82),  .A1(ra81),  .A0(ra80),  .DO65(do_h32),  .DO64(do_h31),
        .DO63(do_h30),  .DO62(do_h29),  .DO61(do_h28),  .DO60(do_h27),  .DO59
        (do_h26),  .DO58(do_h25),  .DO57(do_h24),  .DO56(do_h23),  .DO55(do_h22),
        .DO54(do_h21),  .DO53(do_h20),  .DO52(do_h19),  .DO51(do_h18),  .DO50
        (do_h17),  .DO49(do_h16),  .DO48(do_h15),  .DO47(do_h14),  .DO46(do_h13),
        .DO45(do_h12),  .DO44(do_h11),  .DO43(do_h10),  .DO42(do_h9),  .DO41(do_h8)
        , .DO40(do_h7),  .DO39(do_h6),  .DO38(do_h5),  .DO37(do_h4),  .DO36(do_h3),
        .DO35(do_h2),  .DO34(do_h1),  .DO33(do_h0),  .DO32(do_l32),  .DO31(do_l31),
        .DO30(do_l30),  .DO29(do_l29),  .DO28(do_l28),  .DO27(do_l27),  .DO26
        (do_l26),  .DO25(do_l25),  .DO24(do_l24),  .DO23(do_l23),  .DO22(do_l22),
        .DO21(do_l21),  .DO20(do_l20),  .DO19(do_l19),  .DO18(do_l18),  .DO17
        (do_l17),  .DO16(do_l16),  .DO15(do_l15),  .DO14(do_l14),  .DO13(do_l13),
        .DO12(do_l12),  .DO11(do_l11),  .DO10(do_l10),  .DO9(do_l9),  .DO8(do_l8),
        .DO7(do_l7),  .DO6(do_l6),  .DO5(do_l5),  .DO4(do_l4),  .DO3(do_l3),  .DO2
        (do_l2),  .DO1(do_l1),  .DO0(do_l0));
      rf64x66e2t urm5 (.DI65(di32),  .DI64(di31),  .DI63(di30),  .DI62(di29),  .DI61
        (di28),  .DI60(di27),  .DI59(di26),  .DI58(di25),  .DI57(di24),  .DI56(di23)
        , .DI55(di22),  .DI54(di21),  .DI53(di20),  .DI52(di19),  .DI51(di18),  .DI50
        (di17),  .DI49(di16),  .DI48(di15),  .DI47(di14),  .DI46(di13),  .DI45(di12)
        , .DI44(di11),  .DI43(di10),  .DI42(di9),  .DI41(di8),  .DI40(di7),  .DI39
        (di6),  .DI38(di5),  .DI37(di4),  .DI36(di3),  .DI35(di2),  .DI34(di1),  .DI33
        (di0),  .DI32(di32),  .DI31(di31),  .DI30(di30),  .DI29(di29),  .DI28(di28),
        .DI27(di27),  .DI26(di26),  .DI25(di25),  .DI24(di24),  .DI23(di23),  .DI22
        (di22),  .DI21(di21),  .DI20(di20),  .DI19(di19),  .DI18(di18),  .DI17(di17)
        , .DI16(di16),  .DI15(di15),  .DI14(di14),  .DI13(di13),  .DI12(di12),  .DI11
        (di11),  .DI10(di10),  .DI9(di9),  .DI8(di8),  .DI7(di7),  .DI6(di6),  .DI5
        (di5),  .DI4(di4),  .DI3(di3),  .DI2(di2),  .DI1(di1),  .DI0(di0),  .WE1
        (we_h5),  .WE0(we_15),  .OE1(re5),  .OE0(re5),  .A5(ra55),  .A4(ra54),  .A3
        (ra53),  .A2(ra52),  .A1(ra51),  .A0(ra50),  .DO65(do_h32),  .DO64(do_h31),
        .DO63(do_h30),  .DO62(do_h29),  .DO61(do_h28),  .DO60(do_h27),  .DO59
        (do_h26),  .DO58(do_h25),  .DO57(do_h24),  .DO56(do_h23),  .DO55(do_h22),
        .DO54(do_h21),  .DO53(do_h20),  .DO52(do_h19),  .DO51(do_h18),  .DO50
        (do_h17),  .DO49(do_h16),  .DO48(do_h15),  .DO47(do_h14),  .DO46(do_h13),
        .DO45(do_h12),  .DO44(do_h11),  .DO43(do_h10),  .DO42(do_h9),  .DO41(do_h8)
        , .DO40(do_h7),  .DO39(do_h6),  .DO38(do_h5),  .DO37(do_h4),  .DO36(do_h3),
        .DO35(do_h2),  .DO34(do_h1),  .DO33(do_h0),  .DO32(do_l32),  .DO31(do_l31),
        .DO30(do_l30),  .DO29(do_l29),  .DO28(do_l28),  .DO27(do_l27),  .DO26
        (do_l26),  .DO25(do_l25),  .DO24(do_l24),  .DO23(do_l23),  .DO22(do_l22),
        .DO21(do_l21),  .DO20(do_l20),  .DO19(do_l19),  .DO18(do_l18),  .DO17
        (do_l17),  .DO16(do_l16),  .DO15(do_l15),  .DO14(do_l14),  .DO13(do_l13),
        .DO12(do_l12),  .DO11(do_l11),  .DO10(do_l10),  .DO9(do_l9),  .DO8(do_l8),
        .DO7(do_l7),  .DO6(do_l6),  .DO5(do_l5),  .DO4(do_l4),  .DO3(do_l3),  .DO2
        (do_l2),  .DO1(do_l1),  .DO0(do_l0));
      rf64x66e2t urm6 (.DI65(di32),  .DI64(di31),  .DI63(di30),  .DI62(di29),  .DI61
        (di28),  .DI60(di27),  .DI59(di26),  .DI58(di25),  .DI57(di24),  .DI56(di23)
        , .DI55(di22),  .DI54(di21),  .DI53(di20),  .DI52(di19),  .DI51(di18),  .DI50
        (di17),  .DI49(di16),  .DI48(di15),  .DI47(di14),  .DI46(di13),  .DI45(di12)
        , .DI44(di11),  .DI43(di10),  .DI42(di9),  .DI41(di8),  .DI40(di7),  .DI39
        (di6),  .DI38(di5),  .DI37(di4),  .DI36(di3),  .DI35(di2),  .DI34(di1),  .DI33
        (di0),  .DI32(di32),  .DI31(di31),  .DI30(di30),  .DI29(di29),  .DI28(di28),
        .DI27(di27),  .DI26(di26),  .DI25(di25),  .DI24(di24),  .DI23(di23),  .DI22
        (di22),  .DI21(di21),  .DI20(di20),  .DI19(di19),  .DI18(di18),  .DI17(di17)
        , .DI16(di16),  .DI15(di15),  .DI14(di14),  .DI13(di13),  .DI12(di12),  .DI11
        (di11),  .DI10(di10),  .DI9(di9),  .DI8(di8),  .DI7(di7),  .DI6(di6),  .DI5
        (di5),  .DI4(di4),  .DI3(di3),  .DI2(di2),  .DI1(di1),  .DI0(di0),  .WE1
        (we_h6),  .WE0(we_16),  .OE1(re6),  .OE0(re6),  .A5(ra65),  .A4(ra64),  .A3
        (ra63),  .A2(ra62),  .A1(ra61),  .A0(ra60),  .DO65(do_h32),  .DO64(do_h31),
        .DO63(do_h30),  .DO62(do_h29),  .DO61(do_h28),  .DO60(do_h27),  .DO59
        (do_h26),  .DO58(do_h25),  .DO57(do_h24),  .DO56(do_h23),  .DO55(do_h22),
        .DO54(do_h21),  .DO53(do_h20),  .DO52(do_h19),  .DO51(do_h18),  .DO50
        (do_h17),  .DO49(do_h16),  .DO48(do_h15),  .DO47(do_h14),  .DO46(do_h13),
        .DO45(do_h12),  .DO44(do_h11),  .DO43(do_h10),  .DO42(do_h9),  .DO41(do_h8)
        , .DO40(do_h7),  .DO39(do_h6),  .DO38(do_h5),  .DO37(do_h4),  .DO36(do_h3),
        .DO35(do_h2),  .DO34(do_h1),  .DO33(do_h0),  .DO32(do_l32),  .DO31(do_l31),
        .DO30(do_l30),  .DO29(do_l29),  .DO28(do_l28),  .DO27(do_l27),  .DO26
        (do_l26),  .DO25(do_l25),  .DO24(do_l24),  .DO23(do_l23),  .DO22(do_l22),
        .DO21(do_l21),  .DO20(do_l20),  .DO19(do_l19),  .DO18(do_l18),  .DO17
        (do_l17),  .DO16(do_l16),  .DO15(do_l15),  .DO14(do_l14),  .DO13(do_l13),
        .DO12(do_l12),  .DO11(do_l11),  .DO10(do_l10),  .DO9(do_l9),  .DO8(do_l8),
        .DO7(do_l7),  .DO6(do_l6),  .DO5(do_l5),  .DO4(do_l4),  .DO3(do_l3),  .DO2
        (do_l2),  .DO1(do_l1),  .DO0(do_l0));
      rf64x66e2t urm4 (.DI65(di32),  .DI64(di31),  .DI63(di30),  .DI62(di29),  .DI61
        (di28),  .DI60(di27),  .DI59(di26),  .DI58(di25),  .DI57(di24),  .DI56(di23)
        , .DI55(di22),  .DI54(di21),  .DI53(di20),  .DI52(di19),  .DI51(di18),  .DI50
        (di17),  .DI49(di16),  .DI48(di15),  .DI47(di14),  .DI46(di13),  .DI45(di12)
        , .DI44(di11),  .DI43(di10),  .DI42(di9),  .DI41(di8),  .DI40(di7),  .DI39
        (di6),  .DI38(di5),  .DI37(di4),  .DI36(di3),  .DI35(di2),  .DI34(di1),  .DI33
        (di0),  .DI32(di32),  .DI31(di31),  .DI30(di30),  .DI29(di29),  .DI28(di28),
        .DI27(di27),  .DI26(di26),  .DI25(di25),  .DI24(di24),  .DI23(di23),  .DI22
        (di22),  .DI21(di21),  .DI20(di20),  .DI19(di19),  .DI18(di18),  .DI17(di17)
        , .DI16(di16),  .DI15(di15),  .DI14(di14),  .DI13(di13),  .DI12(di12),  .DI11
        (di11),  .DI10(di10),  .DI9(di9),  .DI8(di8),  .DI7(di7),  .DI6(di6),  .DI5
        (di5),  .DI4(di4),  .DI3(di3),  .DI2(di2),  .DI1(di1),  .DI0(di0),  .WE1
        (we_h4),  .WE0(we_14),  .OE1(re4),  .OE0(re4),  .A5(ra45),  .A4(ra44),  .A3
        (ra43),  .A2(ra42),  .A1(ra41),  .A0(ra40),  .DO65(do_h32),  .DO64(do_h31),
        .DO63(do_h30),  .DO62(do_h29),  .DO61(do_h28),  .DO60(do_h27),  .DO59
        (do_h26),  .DO58(do_h25),  .DO57(do_h24),  .DO56(do_h23),  .DO55(do_h22),
        .DO54(do_h21),  .DO53(do_h20),  .DO52(do_h19),  .DO51(do_h18),  .DO50
        (do_h17),  .DO49(do_h16),  .DO48(do_h15),  .DO47(do_h14),  .DO46(do_h13),
        .DO45(do_h12),  .DO44(do_h11),  .DO43(do_h10),  .DO42(do_h9),  .DO41(do_h8)
        , .DO40(do_h7),  .DO39(do_h6),  .DO38(do_h5),  .DO37(do_h4),  .DO36(do_h3),
        .DO35(do_h2),  .DO34(do_h1),  .DO33(do_h0),  .DO32(do_l32),  .DO31(do_l31),
        .DO30(do_l30),  .DO29(do_l29),  .DO28(do_l28),  .DO27(do_l27),  .DO26
        (do_l26),  .DO25(do_l25),  .DO24(do_l24),  .DO23(do_l23),  .DO22(do_l22),
        .DO21(do_l21),  .DO20(do_l20),  .DO19(do_l19),  .DO18(do_l18),  .DO17
        (do_l17),  .DO16(do_l16),  .DO15(do_l15),  .DO14(do_l14),  .DO13(do_l13),
        .DO12(do_l12),  .DO11(do_l11),  .DO10(do_l10),  .DO9(do_l9),  .DO8(do_l8),
        .DO7(do_l7),  .DO6(do_l6),  .DO5(do_l5),  .DO4(do_l4),  .DO3(do_l3),  .DO2
        (do_l2),  .DO1(do_l1),  .DO0(do_l0));
// warning - component \S1i1126 has unconnected pins: 0 input, 0 output, 1 inout.
// warning - component \S1i1125 has unconnected pins: 0 input, 0 output, 1 inout.
// warning - component \S1i1124 has unconnected pins: 0 input, 0 output, 1 ino
```

```
ut.
// warning - component  \$1i1123  has unconnected pins: 0 input, 0 output, 1 ino
ut.
// warning - component  \$1i1122  has unconnected pins: 0 input, 0 output, 1 ino
ut.
// warning - component  \$1i1121  has unconnected pins: 0 input, 0 output, 1 ino
ut.
// warning - component  \$1i1120  has unconnected pins: 0 input, 0 output, 1 ino
ut.
// warning - component  \$1i1119  has unconnected pins: 0 input, 0 output, 1 ino
ut.
// warning - component  \$1i1118  has unconnected pins: 0 input, 0 output, 1 ino
ut.
// warning - component  \$1i1117  has unconnected pins: 0 input, 0 output, 1 ino
ut.
// warning - component  \$1i1116  has unconnected pins: 0 input, 0 output, 1 ino
ut.
// warning - component  \$1i1115  has unconnected pins: 0 input, 0 output, 1 ino
ut.
// warning - component  \$1i1114  has unconnected pins: 0 input, 0 output, 1 ino
ut.
// warning - component  \$1i1113  has unconnected pins: 0 input, 0 output, 1 ino
ut.
// warning - component  \$1i1112  has unconnected pins: 0 input, 0 output, 1 ino
ut.
// warning - component  \$1i1111  has unconnected pins: 0 input, 0 output, 1 ino
ut.
// warning - component  \$1i1110  has unconnected pins: 0 input, 0 output, 1 ino
ut.
// warning - component  \$1i1109  has unconnected pins: 0 input, 0 output, 1 ino
ut.
// warning - component  \$1i1108  has unconnected pins: 0 input, 0 output, 1 ino
ut.
// warning - component  \$1i1107  has unconnected pins: 0 input, 0 output, 1 ino
ut.
// warning - component  \$1i1106  has unconnected pins: 0 input, 0 output, 1 ino
ut.
// warning - component  \$1i1105  has unconnected pins: 0 input, 0 output, 1 ino
ut.
// warning - component  \$1i1104  has unconnected pins: 0 input, 0 output, 1 ino
ut.
// warning - component  \$1i1103  has unconnected pins: 0 input, 0 output, 1 ino
ut.
// warning - component  \$1i1102  has unconnected pins: 0 input, 0 output, 1 ino
ut.
// warning - component  \$1i1101  has unconnected pins: 0 input, 0 output, 1 ino
ut.
// warning - component  \$1i1100  has unconnected pins: 0 input, 0 output, 1 ino
ut.
// warning - component  \$1i1099  has unconnected pins: 0 input, 0 output, 1 ino
ut.
// warning - component  \$1i1098  has unconnected pins: 0 input, 0 output, 1 ino
ut.
// warning - component  \$1i1097  has unconnected pins: 0 input, 0 output, 1 ino
ut.
// warning - component  \$1i1096  has unconnected pins: 0 input, 0 output, 1 ino
ut.
// warning - component  \$1i1095  has unconnected pins: 0 input, 0 output, 1 ino
ut.
// warning - component  \$1i1094  has unconnected pins: 0 input, 0 output, 1 ino
ut.
// warning - component  \$1i1053  has unconnected pins: 0 input, 0 output, 1 ino
ut.
// warning - component  \$1i1052  has unconnected pins: 0 input, 0 output, 1 ino
ut.
// warning - component  \$1i1051  has unconnected pins: 0 input, 0 output, 1 ino
ut.
// warning - component  \$1i1050  has unconnected pins: 0 input, 0 output, 1 ino
ut.
// warning - component  \$1i1049  has unconnected pins: 0 input, 0 output, 1 ino
ut.
// warning - component  \$1i1048  has unconnected pins: 0 input, 0 output, 1 ino
ut.
// warning - component  \$1i1047  has unconnected pins: 0 input, 0 output, 1 ino
ut.
// warning - component  \$1i1046  has unconnected pins: 0 input, 0 output, 1 ino
ut.
// warning - component  \$1i1045  has unconnected pins: 0 input, 0 output, 1 ino
ut.
// warning - component  \$1i1044  has unconnected pins: 0 input, 0 output, 1 ino
ut.
// warning - component  \$1i1043  has unconnected pins: 0 input, 0 output, 1 ino
ut.
// warning - component  \$1i1042  has unconnected pins: 0 input, 0 output, 1 ino
ut.
// warning - component  \$1i1041  has unconnected pins: 0 input, 0 output, 1 ino
ut.
// warning - component  \$1i1040  has unconnected pins: 0 input, 0 output, 1 ino
ut.
// warning - component  \$1i1039  has unconnected pins: 0 input, 0 output, 1 ino
ut.
// warning - component  \$1i1038  has unconnected pins: 0 input, 0 output, 1 ino
ut.
// warning - component  \$1i1037  has unconnected pins: 0 input, 0 output, 1 ino
ut.
// warning - component  \$1i1036  has unconnected pins: 0 input, 0 output, 1 ino
ut.
// warning - component  \$1i1035  has unconnected pins: 0 input, 0 output, 1 ino
ut.
// warning - component  \$1i1034  has unconnected pins: 0 input, 0 output, 1 ino
ut.
// warning - component  \$1i1033  has unconnected pins: 0 input, 0 output, 1 ino
ut.
// warning - component  \$1i1032  has unconnected pins: 0 input, 0 output, 1 ino
ut.
// warning - component  \$1i1031  has unconnected pins: 0 input, 0 output, 1 ino
ut.
```

48

```
// warning - component  \$1i1030  has unconnected pins: 0 input, 0 output, 1 ino
ut.
// warning - component  \$1i1029  has unconnected pins: 0 input, 0 output, 1 ino
ut.
// warning - component  \$1i1028  has unconnected pins: 0 input, 0 output, 1 ino
ut.
// warning - component  \$1i1027  has unconnected pins: 0 input, 0 output, 1 ino
ut.
// warning - component  \$1i1026  has unconnected pins: 0 input, 0 output, 1 ino
ut.
// warning - component  \$1i1025  has unconnected pins: 0 input, 0 output, 1 ino
ut.
// warning - component  \$1i1024  has unconnected pins: 0 input, 0 output, 1 ino
ut.
// warning - component  \$1i1023  has unconnected pins: 0 input, 0 output, 1 ino
ut.
// warning - component  \$1i1022  has unconnected pins: 0 input, 0 output, 1 ino
ut.
// warning - component  \$1i1021  has unconnected pins: 0 input, 0 output, 1 ino
ut.
endmodule  // rpb_pbuf_ram // design name: spb_pbuf_ram
// options   : -n -i -e -t/tools/verilnet/translation_lib.t
//             -g/tools/verilnet/ -ospb_pbuf_ram.v
// levels    : level adap module spb_pbuf_ram (di65, di64, di63, di62, di61, di60, di59, di58, di57,
    di56, di55, di54, di53, di52, di51, di50, di49, di48, di47, di46, di45,
    di44, di43, di42, di41, di40, di39, di38, di37, di36, di35, di34, di33,
    di32, di31, di30, di29, di28, di27, di26, di25, di24, di23, di22, di21,
    di20, di19, di18, di17, di16, di15, di14, di13, di12, di11, di10, di9,
    di8, di7, di6, di5, di4, di3, di2, di1, di0, we_h8, we_h7, we_h6, we_h5
    , we_h4, we_h3, we_h2, we_h1, we_h0, we_18, we_17, we_16, we_15, we_14,
    we_13, we_12, we_11, we_10, re8, re7, re6, re5, re4, re3, re2, re1, re0
    , do_h32, do_h31, do_h30, do_h29, do_h28, do_h27, do_h26, do_h25, do_h24
    , do_h23, do_h22, do_h21, do_h20, do_h19, do_h18, do_h17, do_h16, do_h15
    , do_h14, do_h13, do_h12, do_h11, do_h10, do_h9, do_h8, do_h7, do_h6,
    do_h5, do_h4, do_h3, do_h2, do_h1, do_h0, do_132, do_131, do_130, do_129
    , do_128, do_127, do_126, do_125, do_124, do_123, do_122, do_121, do_120
    , do_119, do_118, do_117, do_116, do_115, do_114, do_113, do_112, do_111
    , do_110, do_19, do_18, do_17, do_16, do_15, do_14, do_13, do_12, do_11
    , do_10, ra05, ra04, ra03, ra02, ra01, ra00, ra15, ra14, ra13, ra12,
    ra11, ra10, ra25, ra24, ra23, ra22, ra21, ra20, ra35, ra34, ra33, ra32,
    ra31, ra30, ra45, ra44, ra43, ra42, ra41, ra40, ra55, ra54, ra53, ra52,
    ra51, ra50, ra65, ra64, ra63, ra62, ra61, ra60, ra75, ra74, ra73, ra72,
    ra71, ra70, ra85, ra84, ra83, ra82, ra81, ra80);
output do_h32, do_h31, do_h30, do_h29, do_h28, do_h27, do_h26, do_h25,
    do_h24, do_h23, do_h22, do_h21, do_h20, do_h19, do_h18, do_h17, do_h16,
    do_h15, do_h14, do_h13, do_h12, do_h11, do_h10, do_h9, do_h8, do_h7,
    do_h6, do_h5, do_h4, do_h3, do_h2, do_h1, do_h0, do_132, do_131, do_130
    , do_129, do_128, do_127, do_126, do_125, do_124, do_123, do_122, do_121
    , do_120, do_119, do_118, do_117, do_116, do_115, do_114, do_113, do_112
    , do_111, do_110, do_19, do_18, do_17, do_16, do_15, do_14, do_13, do_12
    , do_11, do_10;
input di65, di64, di63, di62, di61, di60, di59, di58, di57, di56, di55,
    di54, di53, di52, di51, di50, di49, di48, di47, di46, di45, di44, di43,
    di42, di41, di40, di39, di38, di37, di36, di35, di34, di33, di32, di31,
    di30, di29, di28, di27, di26, di25, di24, di23, di22, di21, di20, di19,
    di18, di17, di16, di15, di14, di13, di12, di11, di10, di9, di8, di7, di6
    , di5, di4, di3, di2, di1, di0, we_h8, we_h7, we_h6, we_h5, we_h4, we_h3
    , we_h2, we_h1, we_h0, we_18, we_17, we_16, we_15, we_14, we_13, we_12,
    we_11, we_10, re8, re7, re6, re5, re4, re3, re2, re1, re0, ra05, ra04,
    ra03, ra02, ra01, ra00, ra15, ra14, ra13, ra12, ra11, ra10, ra25, ra24,
    ra23, ra22, ra21, ra20, ra35, ra34, ra33, ra32, ra31, ra30, ra45, ra44,
    ra43, ra42, ra41, ra40, ra55, ra54, ra53, ra52, ra51, ra50, ra65, ra64,
    ra63, ra62, ra61, ra60, ra75, ra74, ra73, ra72, ra71, ra70, ra85, ra84,
    ra83, ra82, ra81, ra80;
bushold  \$1i1021  (.Z(do_h32));
bushold  \$1i1022  (.Z(do_h31));
bushold  \$1i1023  (.Z(do_h30));
bushold  \$1i1024  (.Z(do_h29));
bushold  \$1i1025  (.Z(do_h28));
bushold  \$1i1026  (.Z(do_h27));
bushold  \$1i1027  (.Z(do_h26));
bushold  \$1i1028  (.Z(do_h25));
bushold  \$1i1029  (.Z(do_h24));
bushold  \$1i1030  (.Z(do_h23));
bushold  \$1i1031  (.Z(do_h22));
bushold  \$1i1032  (.Z(do_h21));
bushold  \$1i1033  (.Z(do_h20));
bushold  \$1i1034  (.Z(do_h19));
bushold  \$1i1035  (.Z(do_h18));
bushold  \$1i1036  (.Z(do_h17));
bushold  \$1i1037  (.Z(do_h16));
bushold  \$1i1038  (.Z(do_h15));
bushold  \$1i1039  (.Z(do_h14));
bushold  \$1i1040  (.Z(do_h13));
bushold  \$1i1041  (.Z(do_h12));
bushold  \$1i1042  (.Z(do_h11));
bushold  \$1i1043  (.Z(do_h10));
bushold  \$1i1044  (.Z(do_h9));
bushold  \$1i1045  (.Z(do_h8));
bushold  \$1i1046  (.Z(do_h7));
bushold  \$1i1047  (.Z(do_h6));
bushold  \$1i1048  (.Z(do_h5));
bushold  \$1i1049  (.Z(do_h4));
bushold  \$1i1050  (.Z(do_h3));
bushold  \$1i1051  (.Z(do_h2));
bushold  \$1i1052  (.Z(do_h1));
```

```
bushold  \$1i1053  (.Z(do_h0));
bushold  \$1i1094  (.Z(do_l32));
bushold  \$1i1095  (.Z(do_l31));
bushold  \$1i1096  (.Z(do_l30));
bushold  \$1i1097  (.Z(do_l29));
bushold  \$1i1098  (.Z(do_l28));
bushold  \$1i1099  (.Z(do_l27));
bushold  \$1i1100  (.Z(do_l26));
bushold  \$1i1101  (.Z(do_l25));
bushold  \$1i1102  (.Z(do_l24));
bushold  \$1i1103  (.Z(do_l23));
bushold  \$1i1104  (.Z(do_l22));
bushold  \$1i1105  (.Z(do_l21));
bushold  \$1i1106  (.Z(do_l20));
bushold  \$1i1107  (.Z(do_l19));
bushold  \$1i1108  (.Z(do_l18));
bushold  \$1i1109  (.Z(do_l17));
bushold  \$1i1110  (.Z(do_l16));
bushold  \$1i1111  (.Z(do_l15));
bushold  \$1i1112  (.Z(do_l14));
bushold  \$1i1113  (.Z(do_l13));
bushold  \$1i1114  (.Z(do_l12));
bushold  \$1i1115  (.Z(do_l11));
bushold  \$1i1116  (.Z(do_l10));
bushold  \$1i1117  (.Z(do_l9));
bushold  \$1i1118  (.Z(do_l8));
bushold  \$1i1119  (.Z(do_l7));
bushold  \$1i1120  (.Z(do_l6));
bushold  \$1i1121  (.Z(do_l5));
bushold  \$1i1122  (.Z(do_l4));
bushold  \$1i1123  (.Z(do_l3));
bushold  \$1i1124  (.Z(do_l2));
bushold  \$1i1125  (.Z(do_l1));
bushold  \$1i1126  (.Z(do_l0));
rf64x66e2t urm3 (.DI65(di65), .DI64(di64), .DI63(di63), .DI62(di62), .DI61
(di61), .DI60(di60), .DI59(di59), .DI58(di58), .DI57(Ji.7), .DI56(di56)
, .DI55(di55), .DI54(di54), .DI53(di53), .DI52(di52), .DI51(di51), .DI50
(di50), .DI49(di49), .DI48(di48), .DI47(di47), .DI46(di46), .DI45(di45)
, .DI44(di44), .DI43(di43), .DI42(di42), .DI41(di41), .DI40(di40), .DI39
(di39), .DI38(di38), .DI37(di37), .DI36(di36), .DI35(di35), .DI34(di34)
, .DI33(di33), .DI32(di32), .DI31(di31), .DI30(di30), .DI29(di29), .DI28
(di28), .DI27(di27), .DI26(di26), .DI25(di25), .DI24(di24), .DI23(di23)
, .DI22(di22), .DI21(di21), .DI20(di20), .DI19(di19), .DI18(di18), .DI17
(di17), .DI16(di16), .DI15(di15), .DI14(di14), .DI13(di13), .DI12(di12)
, .DI11(di11), .DI10(di10), .DI9(di9), .DI8(di8), .DI7(di7), .DI6(di6),
.DI5(di5), .DI4(di4), .DI3(di3), .DI2(di2), .DI1(di1), .DI0(di0), .WE1
(we_h3), .WE0(we_l3), .OE1(re3), .OE0(re3), .A5(ra35), .A4(ra34), .A3
(ra33), .A2(ra32), .A1(ra31), .A0(ra30), .D065(do_h32), .D064(do_h31),
.D063(do_h30), .D062(do_h29), .D061(do_h28), .D060(do_h27), .D059
(do_h26), .D058(do_h25), .D057(do_h24), .D056(do_h23), .D055(do_h22),
.D054(do_h21), .D053(do_h20), .D052(do_h19), .D051(do_h18), .D050
(do_h17), .D049(do_h16), .D048(do_h15), .D047(do_h14), .D046(do_h13),
.D045(do_h12), .D044(do_h11), .D043(do_h10), .D042(do_h9), .D041(do_h8)
, .D040(do_h7), .D039(do_h6), .D038(do_h5), .D037(do_h4), .D036(do_h3),
.D035(do_h2), .D034(do_h1), .D033(do_h0), .D032(do_l32), .D031(do_l31),
.D030(do_l30), .D029(do_l29), .D028(do_l28), .D027(do_l27), .D026
(do_l26), .D025(do_l25), .D024(do_l24), .D023(do_l23), .D022(do_l22),
.D021(do_l21), .D020(do_l20), .D019(do_l19), .D018(do_l18), .D017
(do_l17), .D016(do_l16), .D015(do_l15), .D014(do_l14), .D013(do_l13),
.D012(do_l12), .D011(do_l11), .D010(do_l10), .D09(do_l9), .D08(do_l8),
.D07(do_l7), .D06(do_l6), .D05(do_l5), .D04(do_l4), .D03(do_l3), .D02
(do_l2), .D01(do_l1), .D00(do_l0));
rf64x66e2t urm2 (.DI65(di65), .DI64(di64), .DI63(di63), .DI62(di62), .DI61
(di61), .DI60(di60), .DI59(di59), .DI58(di58), .DI57(di57), .DI56(di56)
, .DI55(di55), .DI54(di54), .DI53(di53), .DI52(di52), .DI51(di51), .DI50
(di50), .DI49(di49), .DI48(di48), .DI47(di47), .DI46(di46), .DI45(di45)
, .DI44(di44), .DI43(di43), .DI42(di42), .DI41(di41), .DI40(di40), .DI39
(di39), .DI38(di38), .DI37(di37), .DI36(di36), .DI35(di35), .DI34(di34)
, .DI33(di33), .DI32(di32), .DI31(di31), .DI30(di30), .DI29(di29), .DI28
(di28), .DI27(di27), .DI26(di26), .DI25(di25), .DI24(di24), .DI23(di23)
, .DI22(di22), .DI21(di21), .DI20(di20), .DI19(di19), .DI18(di18), .DI17
(di17), .DI16(di16), .DI15(di15), .DI14(di14), .DI13(di13), .DI12(di12)
, .DI11(di11), .DI10(di10), .DI9(di9), .DI8(di8), .DI7(di7), .DI6(di6),
.DI5(di5), .DI4(di4), .DI3(di3), .DI2(di2), .DI1(di1), .DI0(di0), .WE1
(we_h2), .WE0(we_l2), .OE1(re2), .OE0(re2), .A5(ra25), .A4(ra24), .A3
(ra23), .A2(ra22), .A1(ra21), .A0(ra20), .D065(do_h32), .D064(do_h31),
.D063(do_h30), .D062(do_h29), .D061(do_h28), .D060(do_h27), .D059
(do_h26), .D058(do_h25), .D057(do_h24), .D056(do_h23), .D055(do_h22),
.D054(do_h21), .D053(do_h20), .D052(do_h19), .D051(do_h18), .D050
(do_h17), .D049(do_h16), .D048(do_h15), .D047(do_h14), .D046(do_h13),
.D045(do_h12), .D044(do_h11), .D043(do_h10), .D042(do_h9), .D041(do_h8)
, .D040(do_h7), .D039(do_h6), .D038(do_h5), .D037(do_h4), .D036(do_h3),
.D035(do_h2), .D034(do_h1), .D033(do_h0), .D032(do_l32), .D031(do_l31),
.D030(do_l30), .D029(do_l29), .D028(do_l28), .D027(do_l27), .D026
(do_l26), .D025(do_l25), .D024(do_l24), .D023(do_l23), .D022(do_l22),
.D021(do_l21), .D020(do_l20), .D019(do_l19), .D018(do_l18), .D017
(do_l17), .D016(do_l16), .D015(do_l15), .D014(do_l14), .D013(do_l13),
.D012(do_l12), .D011(do_l11), .D010(do_l10), .D09(do_l9), .D08(do_l8),
.D07(do_l7), .D06(do_l6), .D05(do_l5), .D04(do_l4), .D03(do_l3), .D02
(do_l2), .D01(do_l1), .D00(do_l0));
rf64x66e2t urm1 (.DI65(di65), .DI64(di64), .DI63(di63), .DI62(di62), .DI61
(di61), .DI60(di60), .DI59(di59), .DI58(di58), .DI57(di57), .DI56(di56)
, .DI55(di55), .DI54(di54), .DI53(di53), .DI52(di52), .DI51(di51), .DI50
(di50), .DI49(di49), .DI48(di48), .DI47(di47), .DI46(di46), .DI45(di45)
, .DI44(di44), .DI43(di43), .DI42(di42), .DI41(di41), .DI40(di40), .DI39
(di39), .DI38(di38), .DI37(di37), .DI36(di36), .DI35(di35), .DI34(di34)
, .DI33(di33), .DI32(di32), .DI31(di31), .DI30(di30), .DI29(di29), .DI28
(di28), .DI27(di27), .DI26(di26), .DI25(di25), .DI24(di24), .DI23(di23)
, .DI22(di22), .DI21(di21), .DI20(di20), .DI19(di19), .DI18(di18), .DI17
(di17), .DI16(di16), .DI15(di15), .DI14(di14), .DI13(di13), .DI12(di12)
, .DI11(di11), .DI10(di10), .DI9(di9), .DI8(di8), .DI7(di7), .DI6(di6),
.DI5(di5), .DI4(di4), .DI3(di3), .DI2(di2), .DI1(di1), .DI0(di0), .WE1
(we_h1), .WE0(we_l1), .OE1(re1), .OE0(re1), .A5(ra15), .A4(ra14), .A3
(ra13), .A2(ra12), .A1(ra11), .A0(ra10), .D065(do_h32), .D064(do_h31),
.D063(do_h30), .D062(do_h29), .D061(do_h28), .D060(do_h27), .D059
(do_h26), .D058(do_h25), .D057(do_h24), .D056(do_h23), .D055(do_h22),
```

```
        .DO54(do_h21), .DO53(do_h20), .DO52(do_h19), .DO51(do_h18), .DO50
    (do_h17), .DO49(do_h16), .DO48(do_h15), .DO47(do_h14), .DO46(do_h13),
        .DO45(do_h12), .DO44(do_h11), .DO43(do_h10), .DO42(do_h9), .DO41(do_h8)
    , .DO40(do_h7), .DO39(do_h6), .DO38(do_h5), .DO37(do_h4), .DO36(do_h3),
        .DO35(do_h2), .DO34(do_h1), .DO33(do_h0), .DO32(do_l32), .DO31(do_l31),
        .DO30(do_l30), .DO29(do_l29), .DO28(do_l28), .DO27(do_l27), .DO26
    (do_l26), .DO25(do_l25), .DO24(do_l24), .DO23(do_l23), .DO22(do_l22),
        .DO21(do_l21), .DO20(do_l20), .DO19(do_l19), .DO18(do_l18), .DO17
    (do_l17), .DO16(do_l16), .DO15(do_l15), .DO14(do_l14), .DO13(do_l13),
        .DO12(do_l12), .DO11(do_l11), .DO10(do_l10), .DO9(do_l9), .DO8(do_l8),
        .DO7(do_l7), .DO6(do_l6), .DO5(do_l5), .DO4(do_l4), .DO3(do_l3), .DO2
    (do_l2), .DO1(do_l1), .DO0(do_l0));
rf64x66e2t urm0 (.DI65(di65), .DI64(di64), .DI63(di63), .DI62(di62), .DI61
    (di61), .DI60(di60), .DI59(di59), .DI58(di58), .DI57(di57), .DI56(di56)
    , .DI55(di55), .DI54(di54), .DI53(di53), .DI52(di52), .DI51(di51), .DI50
    (di50), .DI49(di49), .DI48(di48), .DI47(di47), .DI46(di46), .DI45(di45)
    , .DI44(di44), .DI43(di43), .DI42(di42), .DI41(di41), .DI40(di40), .DI39
    (di39), .DI38(di38), .DI37(di37), .DI36(di36), .DI35(di35), .DI34(di34)
    , .DI33(di33), .DI32(di32), .DI31(di31), .DI30(di30), .DI29(di29), .DI28
    (di28), .DI27(di27), .DI26(di26), .DI25(di25), .DI24(di24), .DI23(di23)
    , .DI22(di22), .DI21(di21), .DI20(di20), .DI19(di19), .DI18(di18), .DI17
    (di17), .DI16(di16), .DI15(di15), .DI14(di14), .DI13(di13), .DI12(di12)
    , .DI11(di11), .DI10(di10), .DI9(di9), .DI8(di8), .DI7(di7), .DI6(di6),
    .DI5(di5), .DI4(di4), .DI3(di3), .DI2(di2), .DI1(di1), .DI0(di0), .WE1
    (we_h0), .WE0(we_l0), .OE1(re0), .OE0(re0), .A5(ra05), .A4(ra04), .A3
    (ra03), .A2(ra02), .A1(ra01), .A0(ra00), .DO65(do_h32), .DO64(do_h31),
        .DO63(do_h30), .DO62(do_h29), .DO61(do_h28), .DO60(do_h27), .DO59
    (do_h26), .DO58(do_h25), .DO57(do_h24), .DO56(do_h23), .DO55(do_h22),
        .DO54(do_h21), .DO53(do_h20), .DO52(do_h19), .DO51(do_h18), .DO50
    (do_h17), .DO49(do_h16), .DO48(do_h15), .DO47(do_h14), .DO46(do_h13),
        .DO45(do_h12), .DO44(do_h11), .DO43(do_h10), .DO42(do_h9), .DO41(do_h8)
    , .DO40(do_h7), .DO39(do_h6), .DO38(do_h5), .DO37(do_h4), .DO36(do_h3),
        .DO35(do_h2), .DO34(do_h1), .DO33(do_h0), .DO32(do_l32), .DO31(do_l31),
        .DO30(do_l30), .DO29(do_l29), .DO28(do_l28), .DO27(do_l27), .DO26
    (do_l26), .DO25(do_l25), .DO24(do_l24), .DO23(do_l23), .DO22(do_l22),
        .DO21(do_l21), .DO20(do_l20), .DO19(do_l19), .DO18(do_l18), .DO17
    (do_l17), .DO16(do_l16), .DO15(do_l15), .DO14(do_l14), .DO13(do_l13),
        .DO12(do_l12), .DO11(do_l11), .DO10(do_l10), .DO9(do_l9), .DO8(do_l8),
        .DO7(do_l7), .DO6(do_l6), .DO5(do_l5), .DO4(do_l4), .DO3(do_l3), .DO2
    (do_l2), .DO1(do_l1), .DO0(do_l0));
rf64x66e2t urm7 (.DI65(di65), .DI64(di64), .DI63(di63), .DI62(di62), .DI61
    (di61), .DI60(di60), .DI59(di59), .DI58(di58), .DI57(di57), .DI56(di56)
    , .DI55(di55), .DI54(di54), .DI53(di53), .DI52(di52), .DI51(di51), .DI50
    (di50), .DI49(di49), .DI48(di48), .DI47(di47), .DI46(di46), .DI45(di45)
    , .DI44(di44), .DI43(di43), .DI42(di42), .DI41(di41), .DI40(di40), .DI39
    (di39), .DI38(di38), .DI37(di37), .DI36(di36), .DI35(di35), .DI34(di34)
    , .DI33(di33), .DI32(di32), .DI31(di31), .DI30(di30), .DI29(di29), .DI28
    (di28), .DI27(di27), .DI26(di26), .DI25(di25), .DI24(di24), .DI23(di23)
    , .DI22(di22), .DI21(di21), .DI20(di20), .DI19(di19), .DI18(di18), .DI17
    (di17), .DI16(di16), .DI15(di15), .DI14(di14), .DI13(di13), .DI12(di12)
    , .DI11(di11), .DI10(di10), .DI9(di9), .DI8(di8), .DI7(di7), .DI6(di6),
    .DI5(di5), .DI4(di4), .DI3(di3), .DI2(di2), .DI1(di1), .DI0(di0), .WE1
    (we_h7), .WE0(we_l7), .OE1(re7), .OE0(re7), .A5(ra75), .A4(ra74), .A3
    (ra73), .A2(ra72), .A1(ra71), .A0(ra70), .DO65(do_h32), .DO64(do_h31),
        .DO63(do_h30), .DO62(do_h29), .DO61(do_h28), .DO60(do_h27), .DO59
    (do_h26), .DO58(do_h25), .DO57(do_h24), .DO56(do_h23), .DO55(do_h22),
        .DO54(do_h21), .DO53(do_h20), .DO52(do_h19), .DO51(do_h18), .DO50
    (do_h17), .DO49(do_h16), .DO48(do_h15), .DO47(do_h14), .DO46(do_h13),
        .DO45(do_h12), .DO44(do_h11), .DO43(do_h10), .DO42(do_h9), .DO41(do_h8)
    , .DO40(do_h7), .DO39(do_h6), .DO38(do_h5), .DO37(do_h4), .DO36(do_h3),
        .DO35(do_h2), .DO34(do_h1), .DO33(do_h0), .DO32(do_l32), .DO31(do_l31),
        .DO30(do_l30), .DO29(do_l29), .DO28(do_l28), .DO27(do_l27), .DO26
    (do_l26), .DO25(do_l25), .DO24(do_l24), .DO23(do_l23), .DO22(do_l22),
        .DO21(do_l21), .DO20(do_l20), .DO19(do_l19), .DO18(do_l18), .DO17
    (do_l17), .DO16(do_l16), .DO15(do_l15), .DO14(do_l14), .DO13(do_l13),
        .DO12(do_l12), .DO11(do_l11), .DO10(do_l10), .DO9(do_l9), .DO8(do_l8),
        .DO7(do_l7), .DO6(do_l6), .DO5(do_l5), .DO4(do_l4), .DO3(do_l3), .DO2
    (do_l2), .DO1(do_l1), .DO0(do_l0));
rf64x66e2t urm8 (.DI65(di65), .DI64(di64), .DI63(di63), .DI62(di62), .DI61
    (di61), .DI60(di60), .DI59(di59), .DI58(di58), .DI57(di57), .DI56(di56)
    , .DI55(di55), .DI54(di54), .DI53(di53), .DI52(di52), .DI51(di51), .DI50
    (di50), .DI49(di49), .DI48(di48), .DI47(di47), .DI46(di46), .DI45(di45)
    , .DI44(di44), .DI43(di43), .DI42(di42), .DI41(di41), .DI40(di40), .DI39
    (di39), .DI38(di38), .DI37(di37), .DI36(di36), .DI35(di35), .DI34(di34)
    , .DI33(di33), .DI32(di32), .DI31(di31), .DI30(di30), .DI29(di29), .DI28
    (di28), .DI27(di27), .DI26(di26), .DI25(di25), .DI24(di24), .DI23(di23)
    , .DI22(di22), .DI21(di21), .DI20(di20), .DI19(di19), .DI18(di18), .DI17
    (di17), .DI16(di16), .DI15(di15), .DI14(di14), .DI13(di13), .DI12(di12)
    , .DI11(di11), .DI10(di10), .DI9(di9), .DI8(di8), .DI7(di7), .DI6(di6),
    .DI5(di5), .DI4(di4), .DI3(di3), .DI2(di2), .DI1(di1), .DI0(di0), .WE1
    (we_h8), .WE0(we_l8), .OE1(re8), .OE0(re8), .A5(ra85), .A4(ra84), .A3
    (ra83), .A2(ra82), .A1(ra81), .A0(ra80), .DO65(do_h32), .DO64(do_h31),
        .DO63(do_h30), .DO62(do_h29), .DO61(do_h28), .DO60(do_h27), .DO59
    (do_h26), .DO58(do_h25), .DO57(do_h24), .DO56(do_h23), .DO55(do_h22),
        .DO54(do_h21), .DO53(do_h20), .DO52(do_h19), .DO51(do_h18), .DO50
    (do_h17), .DO49(do_h16), .DO48(do_h15), .DO47(do_h14), .DO46(do_h13),
        .DO45(do_h12), .DO44(do_h11), .DO43(do_h10), .DO42(do_h9), .DO41(do_h8)
    , .DO40(do_h7), .DO39(do_h6), .DO38(do_h5), .DO37(do_h4), .DO36(do_h3),
        .DO35(do_h2), .DO34(do_h1), .DO33(do_h0), .DO32(do_l32), .DO31(do_l31),
        .DO30(do_l30), .DO29(do_l29), .DO28(do_l28), .DO27(do_l27), .DO26
    (do_l26), .DO25(do_l25), .DO24(do_l24), .DO23(do_l23), .DO22(do_l22),
        .DO21(do_l21), .DO20(do_l20), .DO19(do_l19), .DO18(do_l18), .DO17
    (do_l17), .DO16(do_l16), .DO15(do_l15), .DO14(do_l14), .DO13(do_l13),
        .DO12(do_l12), .DO11(do_l11), .DO10(do_l10), .DO9(do_l9), .DO8(do_l8),
        .DO7(do_l7), .DO6(do_l6), .DO5(do_l5), .DO4(do_l4), .DO3(do_l3), .DO2
    (do_l2), .DO1(do_l1), .DO0(do_l0));
rf64x66e2t urm5 (.DI65(di65), .DI64(di64), .DI63(di63), .DI62(di62), .DI61
    (di61), .DI60(di60), .DI59(di59), .DI58(di58), .DI57(di57), .DI56(di56)
    , .DI55(di55), .DI54(di54), .DI53(di53), .DI52(di52), .DI51(di51), .DI50
    (di50), .DI49(di49), .DI48(di48), .DI47(di47), .DI46(di46), .DI45(di45)
    , .DI44(di44), .DI43(di43), .DI42(di42), .DI41(di41), .DI40(di40), .DI39
    (di39), .DI38(di38), .DI37(di37), .DI36(di36), .DI35(di35), .DI34(di34)
    , .DI33(di33), .DI32(di32), .DI31(di31), .DI30(di30), .DI29(di29), .DI28
    (di28), .DI27(di27), .DI26(di26), .DI25(di25), .DI24(di24), .DI23(di23)
    , .DI22(di22), .DI21(di21), .DI20(di20), .DI19(di19), .DI18(di18), .DI17
    (di17), .DI16(di16), .DI15(di15), .DI14(di14), .DI13(di13), .DI12(di12)
    , .DI11(di11), .DI10(di10), .DI9(di9), .DI8(di8), .DI7(di7), .DI6(di6),
```

```
       .DI5(di5),  .DI4(di4),  .DI3(di3),  .DI2(di2),  .DI1(di1),  .DI0(di0),  .WE1
       (we_h5),  .WE0(we_l5),  .OE1(re5),  .OE0(re5),  .A5(ra55),  .A4(ra54),  .A3
       (ra53),  .A2(ra52),  .A1(ra51),  .A0(ra50),  .DO65(do_h32),  .DO64(do_h31),
       .DO63(do_h30),  .DO62(do_h29),  .DO61(do_h28),  .DO60(do_h27),  .DO59
       (do_h26),  .DO58(do_h25),  .DO57(do_h24),  .DO56(do_h23),  .DO55(do_h22),
       .DO54(do_h21),  .DO53(do_h20),  .DO52(do_h19),  .DO51(do_h18),  .DO50
       (do_h17),  .DO49(do_h16),  .DO48(do_h15),  .DO47(do_h14),  .DO46(do_h13),
       .DO45(do_h12),  .DO44(do_h11),  .DO43(do_h10),  .DO42(do_h9),  .DO41(do_h8)
       ,  .DO40(do_h7),  .DO39(do_h6),  .DO38(do_h5),  .DO37(do_h4),  .DO36(do_h3),
       .DO35(do_h2),  .DO34(do_h1),  .DO33(do_h0),  .DO32(do_l32),  .DO31(do_l31),
       .DO30(do_l30),  .DO29(do_l29),  .DO28(do_l28),  .DO27(do_l27),  .DO26
       (do_l26),  .DO25(do_l25),  .DO24(do_l24),  .DO23(do_l23),  .DO22(do_l22),
       .DO21(do_l21),  .DO20(do_l20),  .DO19(do_l19),  .DO18(do_l18),  .DO17
       (do_l17),  .DO16(do_l16),  .DO15(do_l15),  .DO14(do_l14),  .DO13(do_l13),
       .DO12(do_l12),  .DO11(do_l11),  .DO10(do_l10),  .DO9(do_l9),  .DO8(do_l8),
       .DO7(do_l7),  .DO6(do_l6),  .DO5(do_l5),  .DO4(do_l4),  .DO3(do_l3),  .DO2
       (do_l2),  .DO1(do_l1),  .DO0(do_l0));
       rf64x66e2t urm6 (.DI65(di65),  .DI64(di64),  .DI63(di63),  .DI62(di62),  .DI61
       (di61),  .DI60(di60),  .DI59(di59),  .DI58(di58),  .DI57(di57),  .DI56(di56)
       ,  .DI55(di55),  .DI54(di54),  .DI53(di53),  .DI52(di52),  .DI51(di51),  .DI50
       (di50),  .DI49(di49),  .DI48(di48),  .DI47(di47),  .DI46(di46),  .DI45(di45)
       ,  .DI44(di44),  .DI43(di43),  .DI42(di42),  .DI41(di41),  .DI40(di40),  .DI39
       (di39),  .DI38(di38),  .DI37(di37),  .DI36(di36),  .DI35(di35),  .DI34(di34)
       ,  .DI33(di33),  .DI32(di32),  .DI31(di31),  .DI30(di30),  .DI29(di29),  .DI28
       (di28),  .DI27(di27),  .DI26(di26),  .DI25(di25),  .DI24(di24),  .DI23(di23)
       ,  .DI22(di22),  .DI21(di21),  .DI20(di20),  .DI19(di19),  .DI18(di18),  .DI17
       (di17),  .DI16(di16),  .DI15(di15),  .DI14(di14),  .DI13(di13),  .DI12(di12)
       ,  .DI11(di11),  .DI10(di10),  .DI9(di9),  .DI8(di8),  .DI7(di7),  .DI6(di6),
       .DI5(di5),  .DI4(di4),  .DI3(di3),  .DI2(di2),  .DI1(di1),  .DI0(di0),  .WE1
       (we_h6),  .WE0(we_l6),  .OE1(re6),  .OE0(re6),  .A5(ra65),  .A4(ra64),  .A3
       (ra63),  .A2(ra62),  .A1(ra61),  .A0(ra60),  .DO65(do_h32),  .DO64(do_h31),
       .DO63(do_h30),  .DO62(do_h29),  .DO61(do_h28),  .DO60(do_h27),  .DO59
       (do_h26),  .DO58(do_h25),  .DO57(do_h24),  .DO56(do_h23),  .DO55(do_h22),
       .DO54(do_h21),  .DO53(do_h20),  .DO52(do_h19),  .DO51(do_h18),  .DO50
       (do_h17),  .DO49(do_h16),  .DO48(do_h15),  .DO47(do_h14),  .DO46(do_h13),
       .DO45(do_h12),  .DO44(do_h11),  .DO43(do_h10),  .DO42(do_h9),  .DO41(do_h8)
       ,  .DO40(do_h7),  .DO39(do_h6),  .DO38(do_h5),  .DO37(do_h4),  .DO36(do_h3),
       .DO35(do_h2),  .DO34(do_h1),  .DO33(do_h0),  .DO32(do_l32),  .DO31(do_l31),
       .DO30(do_l30),  .DO29(do_l29),  .DO28(do_l28),  .DO27(do_l27),  .DO26
       (do_l26),  .DO25(do_l25),  .DO24(do_l24),  .DO23(do_l23),  .DO22(do_l22),
       .DO21(do_l21),  .DO20(do_l20),  .DO19(do_l19),  .DO18(do_l18),  .DO17
       (do_l17),  .DO16(do_l16),  .DO15(do_l15),  .DO14(do_l14),  .DO13(do_l13),
       .DO12(do_l12),  .DO11(do_l11),  .DO10(do_l10),  .DO9(do_l9),  .DO8(do_l8),
       .DO7(do_l7),  .DO6(do_l6),  .DO5(do_l5),  .DO4(do_l4),  .DO3(do_l3),  .DO2
       (do_l2),  .DO1(do_l1),  .DO0(do_l0));
       rf64x66e2t urm4 (.DI65(di65),  .DI64(di64),  .DI63(di63),  .DI62(di62),  .DI61
       (di61),  .DI60(di60),  .DI59(di59),  .DI58(di58),  .DI57(di57),  .DI56(di56)
       ,  .DI55(di55),  .DI54(di54),  .DI53(di53),  .DI52(di52),  .DI51(di51),  .DI50
       (di50),  .DI49(di49),  .DI48(di48),  .DI47(di47),  .DI46(di46),  .DI45(di45)
       ,  .DI44(di44),  .DI43(di43),  .DI42(di42),  .DI41(di41),  .DI40(di40),  .DI39
       (di39),  .DI38(di38),  .DI37(di37),  .DI36(di36),  .DI35(di35),  .DI34(di34)
       ,  .DI33(di33),  .DI32(di32),  .DI31(di31),  .DI30(di30),  .DI29(di29),  .DI28
       (di28),  .DI27(di27),  .DI26(di26),  .DI25(di25),  .DI24(di24),  .DI23(di23)
       ,  .DI22(di22),  .DI21(di21),  .DI20(di20),  .DI19(di19),  .DI18(di18),  .DI17
       (di17),  .DI16(di16),  .DI15(di15),  .DI14(di14),  .DI13(di13),  .DI12(di12)
       ,  .DI11(di11),  .DI10(di10),  .DI9(di9),  .DI8(di8),  .DI7(di7),  .DI6(di6),
       .DI5(di5),  .DI4(di4),  .DI3(di3),  .DI2(di2),  .DI1(di1),  .DI0(di0),  .WE1
       (we_h4),  .WE0(we_l4),  .OE1(re4),  .OE0(re4),  .A5(ra45),  .A4(ra44),  .A3
       (ra43),  .A2(ra42),  .A1(ra41),  .A0(ra40),  .DO65(do_h32),  .DO64(do_h31),
       .DO63(do_h30),  .DO62(do_h29),  .DO61(do_h28),  .DO60(do_h27),  .DO59
       (do_h26),  .DO58(do_h25),  .DO57(do_h24),  .DO56(do_h23),  .DO55(do_h22),
       .DO54(do_h21),  .DO53(do_h20),  .DO52(do_h19),  .DO51(do_h18),  .DO50
       (do_h17),  .DO49(do_h16),  .DO48(do_h15),  .DO47(do_h14),  .DO46(do_h13),
       .DO45(do_h12),  .DO44(do_h11),  .DO43(do_h10),  .DO42(do_h9),  .DO41(do_h8)
       ,  .DO40(do_h7),  .DO39(do_h6),  .DO38(do_h5),  .DO37(do_h4),  .DO36(do_h3),
       .DO35(do_h2),  .DO34(do_h1),  .DO33(do_h0),  .DO32(do_l32),  .DO31(do_l31),
       .DO30(do_l30),  .DO29(do_l29),  .DO28(do_l28),  .DO27(do_l27),  .DO26
       (do_l26),  .DO25(do_l25),  .DO24(do_l24),  .DO23(do_l23),  .DO22(do_l22),
       .DO21(do_l21),  .DO20(do_l20),  .DO19(do_l19),  .DO18(do_l18),  .DO17
       (do_l17),  .DO16(do_l16),  .DO15(do_l15),  .DO14(do_l14),  .DO13(do_l13),
       .DO12(do_l12),  .DO11(do_l11),  .DO10(do_l10),  .DO9(do_l9),  .DO8(do_l8),
       .DO7(do_l7),  .DO6(do_l6),  .DO5(do_l5),  .DO4(do_l4),  .DO3(do_l3),  .DO2
       (do_l2),  .DO1(do_l1),  .DO0(do_l0));
// warning - component    \$li1126  has unconnected pins: 0 input, 0 output, 1 ino
ut.
// warning - component    \$li1125  has unconnected pins: 0 input, 0 output, 1 ino
ut.
// warning - component    \$li1124  has unconnected pins: 0 input, 0 output, 1 ino
ut.
// warning - component    \$li1123  has unconnected pins: 0 input, 0 output, 1 ino
ut.
// warning - component    \$li1122  has unconnected pins: 0 input, 0 output, 1 ino
ut.
// warning - component    \$li1121  has unconnected pins: 0 input, 0 output, 1 ino
ut.
// warning - component    \$li1120  has unconnected pins: 0 input, 0 output, 1 ino
ut.
// warning - component    \$li1119  has unconnected pins: 0 input, 0 output, 1 ino
ut.
// warning - component    \$li1118  has unconnected pins: 0 input  0 output, 1 ino
ut.
// warning - component    \$li1117  has unconnected pins: 0 input, 0 output, 1 ino
ut.
// warning - component    \$li1116  has unconnected pins: 0 input, 0 output, 1 ino
ut.
// warning - component    \$li1115  has unconnected pins: 0 input, 0 output, 1 ino
ut.
// warning - component    \$li1114  has unconnected pins: 0 input, 0 output, 1 ino
ut.
// warning - component    \$li1113  has unconnected pins: 0 input, 0 output, 1 ino
ut.
// warning - component    \$li1112  has unconnected pins: 0 input, 0 output, 1 ino
ut.
// warning - component    \$li1111  has unconnected pins: 0 input, 0 output, 1 ino
ut.
// warning - component    \$li1110  has unconnected pins: 0 input, 0 output, 1 ino
ut.
```

52

```
// warning - component  \$1i1109  has unconnected pins: 0 input, 0 output, 1 inout.
// warning - component  \$1i1108  has unconnected pins: 0 input, 0 output, 1 inout.
// warning - component  \$1i1107  has unconnected pins: 0 input, 0 output, 1 inout.
// warning - component  \$1i1106  has unconnected pins: 0 input, 0 output, 1 inout.
// warning - component  \$1i1105  has unconnected pins: 0 input, 0 output, 1 inout.
// warning - component  \$1i1104  has unconnected pins: 0 input, 0 output, 1 inout.
// warning - component  \$1i1103  has unconnected pins: 0 input, 0 output, 1 inout.
// warning - component  \$1i1102  has unconnected pins: 0 input, 0 output, 1 inout.
// warning - component  \$1i1101  has unconnected pins: 0 input, 0 output, 1 inout.
// warning - component  \$1i1100  has unconnected pins: 0 input, 0 output, 1 inout.
// warning - component  \$1i1099  has unconnected pins: 0 input, 0 output, 1 inout.
// warning - component  \$1i1098  has unconnected pins: 0 input, 0 output, 1 inout.
// warning - component  \$1i1097  has unconnected pins: 0 input, 0 output, 1 inout.
// warning - component  \$1i1096  has unconnected pins: 0 input, 0 output, 1 inout.
// warning - component  \$1i1095  has unconnected pins: 0 input, 0 output, 1 inout.
// warning - component  \$1i1094  has unconnected pins: 0 input, 0 output, 1 inout.
// warning - component  \$1i1053  has unconnected pins: 0 input, 0 output, 1 inout.
// warning - component  \$1i1052  has unconnected pins: 0 input, 0 output, 1 inout.
// warning - component  \$1i1051  has unconnected pins: 0 input, 0 output, 1 inout.
// warning - component  \$1i1050  has unconnected pins: 0 input, 0 output, 1 inout.
// warning - component  \$1i1049  has unconnected pins: 0 input, 0 output, 1 inout.
// warning - component  \$1i1048  has unconnected pins: 0 input, 0 output, 1 inout.
// warning - component  \$1i1047  has unconnected pins: 0 input, 0 output, 1 inout.
// warning - component  \$1i1046  has unconnected pins: 0 input, 0 output, 1 inout.
// warning - component  \$1i1045  has unconnected pins: 0 input, 0 output, 1 inout.
// warning - component  \$1i1044  has unconnected pins: 0 input, 0 output, 1 inout.
// warning - component  \$1i1043  has unconnected pins: 0 input, 0 output, 1 inout.
// warning - component  \$1i1042  has unconnected pins: 0 input, 0 output, 1 inout.
// warning - component  \$1i1041  has unconnected pins: 0 input, 0 output, 1 inout.
// warning - component  \$1i1040  has unconnected pins: 0 input, 0 output, 1 inout.
// warning - component  \$1i1039  has unconnected pins: 0 input, 0 output, 1 inout.
// warning - component  \$1i1038  has unconnected pins: 0 input, 0 output, 1 inout.
// warning - component  \$1i1037  has unconnected pins: 0 input, 0 output, 1 inout.
// warning - component  \$1i1036  has unconnected pins: 0 input, 0 output, 1 inout.
// warning - component  \$1i1035  has unconnected pins: 0 input, 0 output, 1 inout.
// warning - component  \$1i1034  has unconnected pins: 0 input, 0 output, 1 inout.
// warning - component  \$1i1033  has unconnected pins: 0 input, 0 output, 1 inout.
// warning - component  \$1i1032  has unconnected pins: 0 input, 0 output, 1 inout.
// warning - component  \$1i1031  has unconnected pins: 0 input, 0 output, 1 inout.
// warning - component  \$1i1030  has unconnected pins: 0 input, 0 output, 1 inout.
// warning - component  \$1i1029  has unconnected pins: 0 input, 0 output, 1 inout.
// warning - component  \$1i1028  has unconnected pins: 0 input, 0 output, 1 inout.
// warning - component  \$1i1027  has unconnected pins: 0 input, 0 output, 1 inout.
// warning - component  \$1i1026  has unconnected pins: 0 input, 0 output, 1 inout.
// warning - component  \$1i1025  has unconnected pins: 0 input, 0 output, 1 inout.
// warning - component  \$1i1024  has unconnected pins: 0 input, 0 output, 1 inout.
// warning - component  \$1i1023  has unconnected pins: 0 input, 0 output, 1 inout.
// warning - component  \$1i1022  has unconnected pins: 0 input, 0 output, 1 inout.
// warning - component  \$1i1021  has unconnected pins: 0 input, 0 output, 1 inout.
endmodule  // spb_pbuf_ram
```

What is claimed is:

1. A host adapter circuit for transferring data between a peripheral bus coupled to a peripheral device and a computer bus inside a personal computer, the host adapter circuit comprising:

a memory coupled to each of the peripheral bus and the computer bus, the memory holding data retrieved from a plurality of messages received on the peripheral bus, the memory having storage elements grouped into a plurality of pages, each page having a fixed number of storage elements equal in number to storage elements in another page in the plurality; wherein:

each message in the plurality of messages has a sequence of bits organized into at least a header and a payload;

the host adapter stores in at least a first group of one or more pages a first payload of a first message and thereafter stores in at least a second group of one or more pages a second payload of a second message; and the host adapter uses a page in the first group and a page in the second group simultaneously by receiving at least a portion of the second payload during transmission of the first payload.

2. The host adapter circuit of claim 1 wherein:

the host adapter transmits the second payload from the second group in tandem with transmission of the first payload from the first group.

3. The host adapter circuit of claim 1 wherein:

each payload has a size no larger than a predetermined maximum size; and the fixed number is less than half the predetermined maximum size.

4. The host adapter circuit of claim 1 wherein:

the total number of pages in the plurality is greater than the number required to hold the first payload by at least 1; and the host adapter enables receipt of a third message from the peripheral bus before all the pages in the first group become available.

5. The host adapter circuit of claim 1 further comprising:

a control circuit having a message input bus couplable to the peripheral bus for receipt of the plurality of messages, a write data bus and a write control bus; wherein:

the control circuit drives on the write data bus signals indicative of the second payload on receipt of the second message on the peripheral bus and simultaneously drives a first write control signal active on the write control bus and drives the first write control signal inactive at the end of driving the signals on the write data bus; and a storage circuit having a receive data bus, the storage circuit being coupled to the write data bus and the write control bus, the memory being included in the storage circuit; wherein:

the storage circuit stores, in the second group, signals indicative of the second payload from the write data bus in response to the first write control signal being active and stops storage of the signals from the write data bus in response to the first write control signal being inactive, and passes on to the receive data bus signals stored in the first group and indicative of the first payload for transmission to the computer bus simultaneously during storage of the signals from the write data bus into the second group.

6. The host adapter of claim 5 wherein:

the storage circuit includes, associated with each page, at least a first status storage element;

the storage circuit stores an active signal in the first status storage element for a current page if the first write control signal is active and otherwise stores an inactive signal; and the storage circuit transitions from the current page to a next page while passing signals to the read data bus if the signal in the first status storage element of the current page is inactive; and the storage circuit stops passing signals to the read data bus at the end of the current page if the signal in the first status storage element of the current page is active.

7. The host adapter of claim 6 wherein:

the storage circuit stores an inactive signal in a first status storage element of a previous page when storing an active signal in the first status storage element of a current page, if the data being stored in the current page is at least from the same source and is being transferred to the same destination as the data stored in the previous page.

8. The host adapter circuit of claim 5 wherein:

the peripheral bus is the Fibre Channel (FC) bus transferring Small Computer System Interface (SCSI) signals, and the message input bus is coupled by a serializer-deserializer to the peripheral bus.

9. The host adapter circuit of claim 1 wherein:

the total number of pages is exactly 2P+1, where P is the number of pages required to hold a payload of a predetermined maximum size; and the host adapter enables receipt of a third message as soon as P−1 number of pages become available.

10. The host adapter circuit of claim 1 further comprising:

a control circuit having a message input bus couplable to the peripheral bus for receipt of the plurality of messages, and a write control bus; wherein:

the control circuit drives on the write control bus a first control signal based on the value of a field in a header of a message received from said peripheral bus; and a storage circuit having a receive data bus, and a receive control bus, the storage circuit being coupled to a write data bus and to the write control bus, the memory being included in the storage circuit; wherein:

the storage circuit stores, in the second group, signals indicative of the second payload from the write data bus and passes on to the receive data bus signals stored in the second group in tandem with signals stored in the first group if the first control signal is inactive and otherwise drives a buffer empty signal active on the receive control bus.

11. An integrated circuit comprising:

a memory having an enable terminal, a plurality of first data terminals and a plurality of first address terminals, the memory including a plurality of storage elements grouped into a number of pages, each page having storage elements equal in number to storage elements in another page;

wherein the memory periodically stores into a storage element identified by an address signal on the first address terminals a data signal received on the first data terminals when a signal on the enable terminal is active; and an address generation circuit having a first storage element coupled to the first address terminals for identifying a page, and a second storage element coupled to the first address terminals for identifying an offset within the page identified by the first storage element, the address generation circuit further having a first control terminal;

wherein the address generation circuit:
periodically changes a signal held in the second storage element if a signal on the first control terminal is active; and
resets the signal held in the second storage element and changes a signal held in the first storage element, when the signal held in the second storage element reaches a predetermined limit during the periodic change, and also in response to the signal on the first control terminal becoming inactive.

12. The integrated circuit of claim 11 wherein:

the memory further includes at least one additional storage element associated with each page; and the address generation circuit stores an active signal in the additional storage element associated with the page identified by the first storage element when the signal on the first control terminal becomes inactive.

13. The integrated circuit of claim 12:

wherein the memory has a plurality of second data terminals and a plurality of second address terminals and the memory periodically provides on the second data terminals data from a storage element identified by a signal on the second address terminals; and wherein the address generation circuit has a third storage element coupled to the second address terminals for identifying a page, and fourth storage element coupled to the second address terminals for identifying an offset within the page identified by the third storage element, and the address generation circuit periodically changes a signal held in the fourth storage element if a signal on the first control terminal is active, resets the signal held in the second storage element and changes a signal held in the first storage element, when the signal held in the second storage element reaches a limit during the periodic change, and also in response to the signal on the first control terminal becoming inactive and resets the signal held in the first storage element when the signal in the first storage element reaches another limit during the periodic increment.

14. The integrated circuit of claim 11 wherein the address generation circuit:

resets the signal held in the first storage element when the signal in the first storage element reaches another limit during the periodic increment.

15. A host adapter circuit for transferring data between a peripheral bus coupled to a peripheral device and a computer bus inside a personal computer, the host adapter circuit comprising:

a first memory coupled to each of the peripheral bus and the computer bus, the first memory holding data retrieved from a plurality of messages received on the peripheral bus, the first memory having storage elements grouped into a plurality of pages, each page having a fixed number of storage elements equal in number to storage elements in another page in the plurality; wherein:

each message in the plurality of messages has a sequence of bits organized into at least a header and a payload, each payload having a size no larger than a predetermined maximum size;

the host adapter stores in at least a first group of one or more pages a first payload of a first message and thereafter stores in at least a second group of one or more pages a second payload of a second message; and the host adapter uses a page in the first group and a page in the second group simultaneously by receiving at least a portion of the second payload from the peripheral bus during transmission of the first payload on the computer bus; and a second memory coupled to each of the peripheral bus and the computer bus, the second memory holding data received on the computer bus for transmission to the peripheral bus, the second memory having storage elements grouped into a plurality of pages, each page having a fixed number of storage elements equal in number to the predetermined maximum size; wherein:

the host adapter stores data from the computer bus in at least a first page and thereafter stores the data in at least a second page a second payload of a second message; and the host adapter uses the first page and the second page simultaneously by storing in the second page data being currently received from the computer bus while transmitting on the peripheral bus previously-received data held the first page.

16. The host adapter of claim 15 wherein the host adapter transmits on the computer bus the second payload from the second group in tandem with transmission of the first payload from the first group; and the host adapter receives from the computer bus the data being stored in the second page in tandem with receipt of data stored in the first page.

17. The host adapter of claim 15 wherein the total number of pages in the first memory is at least 2P+1, where P is the number of pages required to hold payload of a predetermined maximum size; and the total number of pages in the second memory is at least 2.

* * * * *